United States Patent
Coats et al.

(10) Patent No.: US 12,369,577 B2
(45) Date of Patent: Jul. 29, 2025

(54) MONOTERPENOID/PHENYLPROPANOID-CONTAINING COMPOUNDS AND METHODS OF THEIR MAKING AND USE AS BAITS

(71) Applicants: KITTRICH CORPORATION, Pomona, CA (US); IOWA STATE UNIVERSITY RESEARCH FOUNDATION, INC., Ames, IA (US)

(72) Inventors: Joel R. Coats, Ames, IA (US); James S. Klimavicz, Ames, IA (US); Edmund J. Norris, Ames, IA (US); Steven M. Bessette, West Palm Beach, FL (US); A. David Lindsay, Denver, CO (US)

(73) Assignees: Kittrich Corporation, Pomona, CA (US); Iowa State University Research Foundation, Inc., Ames, CA (US)

( * ) Notice: Subject to any disclaimer, the term of this patent is extended or adjusted under 35 U.S.C. 154(b) by 1022 days.

(21) Appl. No.: 16/328,275

(22) PCT Filed: Aug. 23, 2017

(86) PCT No.: PCT/US2017/048293
§ 371 (c)(1),
(2) Date: Feb. 25, 2019

(87) PCT Pub. No.: WO2018/039393
PCT Pub. Date: Mar. 1, 2018

(65) Prior Publication Data
US 2023/0189802 A1   Jun. 22, 2023

Related U.S. Application Data

(60) Provisional application No. 62/378,541, filed on Aug. 23, 2016.

(51) Int. Cl.
| | | |
|---|---|---|
| *A01N 25/00* | (2006.01) | |
| *A01N 25/08* | (2006.01) | |
| *A01N 37/06* | (2006.01) | |
| *A01N 37/10* | (2006.01) | |
| *A01N 37/38* | (2006.01) | |
| *A01N 39/04* | (2006.01) | |
| *A01N 43/16* | (2006.01) | |
| *A01P 13/02* | (2006.01) | |

(52) U.S. Cl.
CPC ........... *A01N 25/006* (2013.01); *A01N 25/08* (2013.01); *A01N 37/06* (2013.01); *A01N 37/10* (2013.01); *A01N 37/38* (2013.01); *A01N 39/04* (2013.01); *A01N 43/16* (2013.01); *A01P 13/02* (2021.08)

(58) Field of Classification Search
CPC .................................................. A01N 25/006
See application file for complete search history.

(56) References Cited

PUBLICATIONS

Szczepanik et al (Allelopathy Journal 30 (1): 129-142 (2012)). (Year: 2012).*
VB Silva et al (J Arthropod-Borne Dis, Jun. 2017, 11(2): 315-330). (Year: 2017).*

* cited by examiner

*Primary Examiner* — Benjamin J Packard
(74) *Attorney, Agent, or Firm* — Hudak, Shunk & Farine Co. LPA

(57) ABSTRACT

Disclosed are compounds having a monoterpenoid and/or phenylpropanoid moiety and methods of their making and use as pesticidal compounds, such as insecticidal baits.

2 Claims, 6 Drawing Sheets

MONOTERPENOID/PHENYLPROPANOID-CONTAINING COMPOUNDS AND METHODS OF THEIR MAKING AND USE AS BAITS

CROSS-REFERENCE TO RELATED APPLICATIONS

This patent application claims the benefit of U.S. Provisional Patent Application No. 62/378,541, filed Aug. 23, 2016. The entire disclosures of the above-identified prior provisional patent application and all other concurrently filed non-provisional patent applications claiming the benefit from the provisional application are incorporated herein by reference.

BACKGROUND OF THE INVENTION

The disclosed embodiments relate to compounds having a monoterpenoid and/or phenylpropanoid moiety, and methods of their making and their use.

Many plant essential oils contain monoterpene or monoterpenoid compounds, some of which are insecticidal. Their potency is typically less than for conventional synthetic insecticides, but they are just as effective at causing insect mortality or control when a sufficient dose is delivered to the pest. Some monoterpenoids have been demonstrated to have insect-repellent properties.

Repellent monoterpenoids are not effective in baits, primarily due to the strong odors of these volatile compounds. In some instances, such compounds are volatile and rapidly biodegradable, which results in virtually no insecticidal residues. Absence of residues is a positive feature for many application scenarios, but in certain situations, some persistence or a slow release mechanism would make these monoterpenoids more useful, and open new market opportunities. Some of these new market opportunities include but are not limited to, use of the compounds disclosed herein as insecticidal bait formulations and future products.

The development of the example embodiments of low-volatility esters as "composite" molecules (e.g., bis-esters, tris-esters, tetrakis-esters, pentakis-esters, and hexakis-esters) has allowed for insect ingestion of an insecticidal compound, followed by metabolic release of the insecticidal monomers in the insect gut.

The disclosed embodiments are believed to overcome one or more deficiencies in the art.

SUMMARY OF THE INVENTION

One aspect of the disclosed embodiments relates to a compound of formula (I):

(I)

where
R$_1$ is each independently a phenylpropenoid or monoterpenoid moiety;
L is a polyester-containing linking moiety having a structure

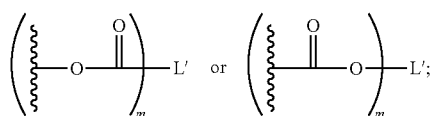

L' is selected from the group consisting of branched or unbranched saturated or unsaturated alkyl or cycloalkyl, aryl, and heteroaryl; and
m is from 2-6.

Another aspect of the disclosed embodiments relates to a compound of formula (IV):

(IV)

where
A is —O—R$_7$,

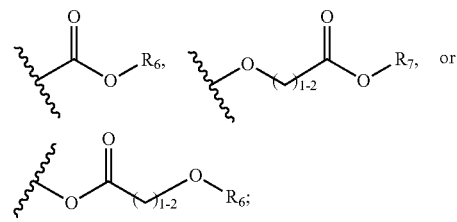

R$_6$ is a phenylpropanoid or monoterpenoid moiety;
R$_7$ is a phenylpropanoid or monoterpenoid moiety or is selected from the group consisting of H, M, substituted or unsubstituted C$_3$-C$_7$ unbranched or branched alkyl, substituted or unsubstituted C$_2$-C$_7$ unbranched or branched alkenyl, substituted or unsubstituted C$_3$-C$_7$ unbranched or branched alkynyl, substituted or unsubstituted C$_3$-C$_7$ unbranched or branched cycloalkyl, substituted or unsubstituted heteroaryl, and substituted or unsubstituted C$_3$-C$_7$ unbranched or branched cycloalkenyl; and M is a counterion selected from the group consisting of sodium, potassium, calcium, magnesium, iron, zinc, copper, and an amine.

A further aspect of the disclosed embodiments relates to a compound of formula (V):

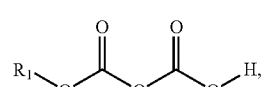
(V)

where
R$_1$ is a phenylpropanoid or monoterpenoid moiety and
Q is selected from the group consisting of branched or unbranched saturated or unsaturated C$_0$-C$_4$ alkyl, branched or unbranched C$_0$-C$_4$ ketone, and branched or unbranched C$_0$-C$_4$ amine.

Another aspect of the disclosed embodiments relates to a method of making a compound having a structure of formula (II):

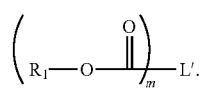
(II)

This method involves reacting
$R_1$—OH with L'-(COOH)$_m$ or
$R_1$—OH with

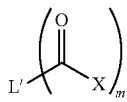

under conditions effective to form a compound having a structure of formula (II), where
  $R_1$ is a monoterpenoid or phenylpropanoid moiety;
  L' is selected from the group consisting of branched or unbranched saturated or unsaturated alkyl or cycloalkyl, aryl, and heteroaryl;
  X is halogen; and
  m is from 2-6.

A further aspect of the disclosed embodiments relates to a method of making a compound having a structure of formula (III):

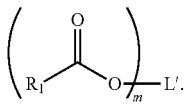

(III)

This method involves reacting
  $R_1$—COOOH with L'-(OH)$_m$ or

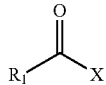

with L'-(OH)$_m$ under conditions effective to form a compound of formula (III), where
  $R_1$ is each independently a phenylpropanoid or monoterpenoid moiety;
  L' is selected from the group consisting of branched or unbranched saturated or unsaturated alkyl or cycloalkyl, aryl, and heteroaryl;
  X is halogen; and
  m is from 2-6.

A further aspect of the disclosed embodiments relates to a composition comprising a compound of formula (IV) where
  A is

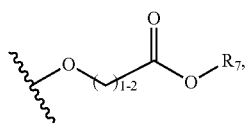

where the carbon in the parentheses in A is 1 and $R_7$ is H and a carrier.

Another aspect of the disclosed embodiments relates to an insecticide composition comprising a compound of formula (I), (IV), or (V) and a carrier.

Yet another aspect relates to a pesticidal bait comprising insecticidal compounds as disclosed herein.

Another aspect of the disclosed embodiments relates to a method of killing an insect. This method involves providing the disclosed insecticide composition in a location to attract an invertebrate, such as an insect. The insect is attracted to the bait, consumes the bait, and is killed by the consumed insecticide composition.

The disclosed embodiments relate to the synthesis of oligoesters from monoterpenoids obtained from biorational sources for use as insecticidal compounds provided as toxic bait formulations against various arthropod species.

According to an example embodiment, the principal monoterpenoid and phenylpropanoid molecules employed are citronellic acid, cinnamic acid, thymol, eugenol, geraniol, menthol, and carvacrol. The poly-esters can be synthesized directly from a monoterpenoid acid or a monoterpenoid alcohol or phenol. Pseudo-dimers and pseudo-trimers have been synthesized by esterifying ethylene glycol, propylene glycol, or glycerol with the citronellic acid, cinnamic acid, or geranic acid. When two cinnamic acid, two citronellic acid, or two geranic acid molecules are esterified with one of the glycols (or three of them are esterified with glycerol), the resultant di-esters (tri-esters, poly-esters) have much lower volatility and greater stability than the monoterpenoid molecules. The spectrum of compounds disclosed and synthesized according to the disclosed embodiments also includes: inverse esters, which were designed from a simple organic dicarboxylic acid (e.g., oxalic, succinic, fumaric, maleic, adipic) and molecules of a monoterpenoid alcohol or phenol. For example, alcohols may include cinnamic alcohol, linalool, geraniol, menthol, etc., while phenols may include carvacrol, thymol, or eugenol.

Certain example embodiments disclosed herein achieve improved bait acceptance of natural monoterpenoid insecticides for ingestion by arthropods, including insects such as flies, cockroaches, and mosquitoes. In one embodiment, the ingestion of the compounds by these pests leads to hydrolysis of the esters in the insect midgut and release of the individual monoterpenoid insecticides and subsequently to toxicity to the pest.

All of the component parts of the example embodiments may be natural or derived from natural sources, and some are included on the U.S. Environmental Protection Agency's Exempt List 25b and/or the U.S. Food and Drug Administration's Generally Recognized As Safe (GRAS) lists, which includes oils and compounds widely used in the food, flavor, fragrance, and cosmetics industries and considered safe for consumer uses.

The example embodiments include, without limitation, bis-, tris-, tetra-, penta-, and hexakis-esters. The disclosed embodiments exhibit toxicity as baits against at least house flies, German cockroaches, and mosquitoes. One or more disclosed compounds may be used as insecticidal baits.

DETAILED DESCRIPTION

Figure 1:
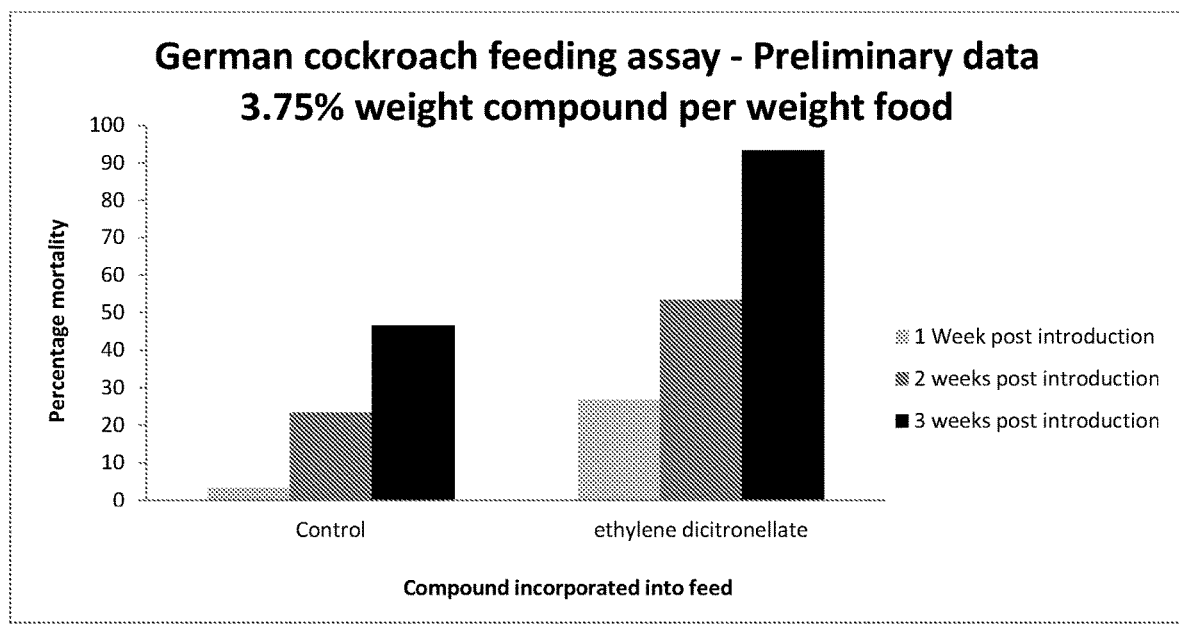
FIG. 1 is a graph showing percentage mortality of German cockroaches exposed to a diet possessing 3.75% ethylene dicitronellate by weight for three consecutive weeks. Percentage mortality in the group provided the esterified monoterpenoid possessed considerably higher percentage mortality at all time points compared to the control group.

The disclosed embodiments relates to compounds having a monoterpenoid and/or phenylpropanoid moiety, and methods of their making and use.
In particular, the disclosed embodiments relate to monoterpenoid and phenylpropanoid compounds derived from biorational sources. As discussed in more detail infra, the monoterpenoid and phenylpropanoid derivative compounds of the embodiments disclosed herein are particularly suited for use as pesticides, including as insecticidal baits.

Throughout this disclosure, the following terms are provided for clarity.

As used herein, the term "monoterpenoid" refers to a monoterpene-like substance and is used to refer collectively to monoterpenoid derivatives as well as monoterpenoid analogs. By "monoterpene," it is meant a compound having a 10-carbon skeleton with non-linear branches. A monoterpene technically refers to a compound with two isoprene units connected in a head-to-end manner. Monoterpenoids can therefore include monoterpenes, alcohols, ketones, aldehydes, esters, ethers, acids, hydrocarbons without an oxygen functional group, and so forth. It is common practice to refer to certain phenolic compounds, such as eugenol, thymol, and carvacrol, as monoterpenoids because their function is essentially the same as a monoterpenoid. However, these compounds are not technically "monoterpenoids" (or "monoterpenes") because they are not synthesized by the same isoprene biosynthesis pathway, but rather by production of phenols from tyrosine. However, common practice will be followed herein.

The term "monoterpenoid alcohol" means any monoterpenoid or phenylpropanoid alcohol or phenol that occurs naturally, including, for example and without limitation: acyclic, unsaturated monoterpenoids, including citronellol, linalool, geraniol, nerol, and lavandulol; cyclic or bicyclic unsaturated monoterpenoids, including carveol, pinocarveol, myrcenol, myrtenol, α-terpineol, 4-terpeniol, verbenol, and perillyl alcohol; cyclic or polycyclic saturated monoterpenoids, including menthol, fenchol, borneol, isoborneol, and myrtanol; isopropyl cresols, including thymol, carvacrol, or 4-isopropyl-3-methylphenol; cycloheptatrienolones, such as any of the isomeric thujaplicins; phenylpropanoid alcohols or phenols, including eugenol, isoeugenol, cinnamyl alcohol, coniferyl alcohol, zingerone, umbelliferone, coumaryl alcohol, and chavicol; or alcohols or phenols produced by the natural plant metabolism of a phenylpropanoid, including vanillin, ethyl vanillin, piperonyl alcohol, or syringaldehyde.

Moreover, O-alkylated and O-acylated monoterpenoids, for example and without limitation etherified monoterpenoids containing carboxylic acid moieties or ester moieties and oligoesters of monoterpenoids containing carboxylic acid moieties are herein referred to as monoterpenoid derivatives.

The term "phenylpropanoid" refers to a diverse group of organic compounds that are synthesized by plants from the amino acid phenylalanine. Their name is derived from the six-carbon, aromatic phenyl group and the three-carbon propene tail of cinnamic acid, which is synthesized from phenylalanine in the first step of phenylpropanoid biosynthesis. Phenylpropanoids are found throughout the plant kingdom, where they serve as essential components of a number of structural polymers, provide protection from ultraviolet light, defend against herbivores and pathogens, and mediate plant-pollinator interactions as floral pigments and scent compounds.

According to one embodiment, the monoterpenoid and/or phenylpropanoid moiety of the compounds of the disclosed embodiments are derived from a biorational source, such as a plant volatile or as a constituent of plant essential oils obtained from the leaf tissue, stem tissue, root tissue, or mixture thereof.

As used herein, the term "alkyl" means an aliphatic hydrocarbon group which may be straight or branched. When not otherwise restricted, the term refers to an alkyl of from 2 to 7 carbons. Exemplary alkyl groups include, for example and without limitation, ethyl, n-propyl, i-propyl, n-butyl, t-butyl, n-pentyl, 3-pentyl, and the like.

The term "alkenyl" means an aliphatic hydrocarbon group containing a carbon-carbon double bond and which may be straight or branched having from 2 to about 7 carbon atoms in the chain. Non-limiting, exemplary alkenyl groups include ethenyl, propenyl, n-butenyl, isoprene, and i-butenyl. The term "alkenyl" may also refer to a hydrocarbon chain having 2 to 7 carbons containing at least one double bond and at least one triple bond.

The term "alkynyl" means an aliphatic hydrocarbon group containing a carbon-carbon triple bond and which may be straight or branched having about 3 to about 7 carbon atoms in the chain. Non-limiting, exemplary alkynyl groups include propynyl, n-butynyl, 2-butynyl, 3-methylbutynyl, propargyl, and n-pentynyl.

The term "cycloalkyl" means a non-aromatic, saturated or unsaturated, mono- or multi-cyclic ring system of about 3 to about 7 carbon atoms. Exemplary cycloalkyl groups include, without limitation, cyclopropyl, cyclobutyl, cyclopentyl, cyclohexyl, and cycloheptyl.

The term "cycloalkenyl" means a non-aromatic, unsaturated, mono- or multi-cyclic ring system of about 3 to about 7 carbon atoms. Exemplary cycloalkenyl groups include, without limitation, cyclopropenyl, cyclobutenyl, cyclopentenyl, cyclohexenyl, and cycloheptenyl.

The term "heteroaryl" means an aromatic monocyclic or multi-cyclic ring system of about 5 to about 19 ring atoms, or about 5 to about 10 ring atoms, in which one or more of the atoms in the ring system is/are element(s) other than carbon, for example, nitrogen, oxygen, or sulfur. In the case of a multi-cyclic ring system, only one of the rings needs to be aromatic for the ring system to be defined as "heteroaryl." Particular heteroaryls contain about 5 to 6 ring atoms. The prefix aza, oxa, thia, or thio before heteroaryl means that at least a nitrogen, oxygen, or sulfur atom, respectively, is present as a ring atom. A nitrogen, carbon, or sulfur atom in the heteroaryl ring may be optionally oxidized; the nitrogen may optionally be quaternized. Suitable heteroaryls include, without limitation, pyridyl, 2-oxo-pyridinyl, pyrimidinyl, pyridazinyl, pyrazinyl, triazinyl, furanyl, pyrrolyl, thiophenyl, pyrazolyl, imidazolyl, oxazolyl, isoxazolyl, thiazolyl, isothiazolyl, triazolyl, oxadiazolyl, thiadiazolyl, tetrazolyl, indolyl, isoindolyl, benzofuranyl, benzothiophenyl, indolinyl, 2-oxoindolinyl, dihydrobenzofuranyl, dihydrobenzothiophenyl, indazolyl, benzimidazolyl, benzooxazolyl, benzothiazolyl, benzoisoxazolyl, benzoisothiazolyl, benzotriazolyl, benzo[1,3]dioxolyl, quinolinyl, isoquinolinyl, quinazolinyl, cinnolinyl, pthalazinyl, quinoxalinyl, 2,3-dihydro-benzo[1,4]dioxinyl, benzo[1,2,3]triazinyl, benzo[1,2,4]triazinyl, 4H-chromenyl, indolizinyl, quinolizinyl, 6aH-thieno[2,3-d]imidazolyl, 1H-pyrrolo[2,3-b]pyridinyl, imidazo[1,2-a]pyridinyl, pyrazolo[1,5-a]pyridinyl, [1,2,4]triazolo[4,3-a]pyridinyl, [1,2,4]triazolo[1,5-a]pyridinyl, thieno[2,3-b]furanyl, thieno[2,3-b]pyridinyl, thieno[3,2-b]pyridinyl, furo[2,3-b]pyridinyl, furo[3,2-b]pyridinyl, thieno[3,2-d]pyrimidinyl, furo[3,2-d]pyrimidinyl, thieno[2,3-b]pyrazinyl, imidazo[1,2-a]pyrazinyl, 5,6,7,8-tetrahydroimidazo[1,2-a]pyrazinyl, 6,7-dihydro-4H-pyrazolo[5,1-c][1,4]oxazinyl, 2-oxo-2,3-dihydrobenzo[d]oxazolyl, 3,3-dimethyl-2-oxoindolinyl, 2-oxo-2,3-dihydro-1H-pyrrolo[2,3-b]pyridinyl, benzo[c][1,2,5]oxadiazolyl, benzo[c][1,2,5]thiadiazolyl, 3,4-dihydro-2H-benzo[b][1,4]oxazinyl, 5,6,7,8-tetrahydro-[1,2,4]triazolo[4,3-a]pyrazinyl, [1,2,4]triazolo[4,3-a]pyrazinyl, 3-oxo-[1,2,4]triazolo[4,3-a]pyridin-2(3H)-yl, and the like.

The term "monocyclic" used herein indicates a molecular structure having one ring.

The term "polycyclic" or "multi-cyclic" used herein indicates a molecular structure having two or more rings, including, but not limited to, fused, bridged, or spiro rings.

The term "halogen" as used herein is intended to include fluorine, bromine, chlorine, and iodine while the term "halide" is intended to include fluoride, bromide, chloride, and iodide anion.

The term "substituted" specifically envisions and allows for one or more substitutions that are common in the art. However, it is generally understood by those skilled in the art that the substituents should be selected so as to not adversely affect the useful characteristics of the compound or adversely interfere with its function. Suitable substituents may include, for example, halogen groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, amino groups, alkyl- and dialkylamino groups, carbamoyl groups, alkylcarbonyl groups, carboxyl groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups, cycloalkyl groups, cyano groups, $C_1$-$C_6$ alkylthio groups, arylthio groups, nitro groups, keto groups, acyl groups, boronate or boronyl groups, phosphate or phosphonyl groups, sulfamyl groups, sulfonyl groups, sulfinyl groups, and combinations thereof. In the case of substituted combinations, such as "substituted arylalkyl," either the aryl or the alkyl group may be substituted, or both the aryl and the alkyl groups may be substituted with one or more substituents. Additionally, in some cases, suitable substituents may combine to form one or more rings as known to those of skill in the art.

According to one embodiment, the compounds are substituted, meaning a group may have a substituent at a substitutable atom of the group (including more than one substituent on a single atom), provided that the designated atom's normal valence is not exceeded and the identity of each substituent is independent of the others. For example, up to three H atoms in each residue are replaced with substituents such as alkyl, halogen, haloalkyl, hydroxy, loweralkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, heteroaryl, phenoxy, benzyloxy, or heteroaryloxy. When a substituent is keto (i.e., =O), then two hydrogens on the atom are replaced. Combinations of substituents and/or variables are permissible only if such combinations result in stable compounds; by "stable compound" it is meant a compound that is sufficiently robust to survive isolation to a useful degree of purity from a reaction mixture, and formulation into an agent intended for a suitable use.

According to certain embodiments, the compounds are unsubstituted. "Unsubstituted" atoms bear all of the hydrogen atoms dictated by their valence.

The term "compound," and equivalent expressions, are meant to embrace compounds as described herein. Also contemplated are salts, oxides, solvates, e.g., hydrates, and inclusion complexes of the compounds, where the context so permits, as well as any stereoisomeric form, or a mixture of any such forms of that compound in any ratio. Inclusion complexes are described in Remington, The Science and Practice of Pharmacy, 19th Ed. 1:176-177 (1995), which is hereby incorporated by reference in its entirety. The most commonly employed inclusion complexes are those with cyclodextrins, and all cyclodextrin complexes, natural and synthetic, are specifically encompassed by the compounds disclosed herein.

Compounds described herein may contain one or more asymmetric centers and may thus give rise to enantiomers, diastereomers, and other stereoisomeric forms. Each chiral center may be defined, in terms of absolute stereochemistry, as (R)- or (S)-. This is meant to include all such possible isomers, as well as mixtures thereof, including racemic and optically pure forms. Optically active (R)- and (S)-, (−)- and (+)-, or (D)- and (L)-isomers may be prepared using chiral synthons or chiral reagents, or resolved using conventional techniques. When the compounds described herein contain olefinic double bonds or other centers of geometric asymmetry, and unless specified otherwise, it is intended that the compounds include both E and Z geometric isomers. Likewise, all tautomeric forms are also intended to be included.

A first aspect of the disclosed embodiments relates to a compound of formula (I):

$$(R_1)_m\text{—}L, \tag{I}$$

where
  $R_1$ is each independently a phenylpropenoid or monoterpenoid moiety;
  L is a polyester-containing linking moiety having a structure $$\left(\!\!\begin{array}{c}\xi\\\xi\end{array}\!\!\text{—O}\overset{O}{\underset{\|}{\text{—}}}\right)_{\!\!m}\!\!\text{—L' or }\left(\!\!\begin{array}{c}\xi\\\xi\end{array}\!\!\overset{O}{\underset{\|}{\text{—}}}\text{—O}\right)_{\!\!m}\!\!\text{—L';}$$

L' is selected from the group consisting of branched or unbranched saturated or unsaturated alkyl or cycloalkyl, aryl, and heteroaryl; and
  m is from 2-6.

It will be appreciated by a person of ordinary skill in the art that when m is 2, then the compound of formula (I) has a structure $$R_1\text{-L-}R_1,$$

and when m is 3, then the compound of formula (I) has a structure $$R_1\text{—}\underset{\underset{R_1}{|}}{L}\text{—}R_1.$$

According to one embodiment of this aspect, the compound has a structure of formula (II):

$$\left(R_1\text{—O}\overset{O}{\underset{\|}{\text{—}}}\right)_{\!\!m}\!\!\text{—L'}, \tag{II}$$

where
  $R_1$ is each independently a phenylpropenoid or monoterpenoid moiety;

L' is selected from the group consisting of branched or unbranched saturated or unsaturated alkyl or cycloalkyl, aryl, and heteroaryl; and
  m is from 2-6.

It will be appreciated by a person of ordinary skill in the art that when m is 2, then the compound of formula (II) has a structure $$R_1O\overset{O}{\underset{\|}{\text{—}}}\text{—L'—}\overset{O}{\underset{\|}{\text{—}}}\text{—O}R_1,$$

and when m is 3, then the compound of formula (II) has a structure $$R_1O\overset{O}{\underset{\|}{\text{—}}}\text{—L'—}\overset{O}{\underset{\|}{\text{—}}}\text{—O}R_1.$$
$$\underset{OR_1}{\overset{O=}{|}}$$

In a specific embodiment, L', is bound to a polyester (L) having a structure:

[structure with O—C(=O)—O—Q—O—C(=O)—O]

where
  Q is selected from the group consisting of branched or unbranched saturated or unsaturated $C_0$-$C_4$ alkyl, branched or unbranched $C_0$-$C_4$ ketone, and branched or unbranched $C_0$-$C_4$ amine.

In a more specific embodiment, Q is —$(CH_2)_n$—, and n is from 0 to 4.

In another more specific embodiment, Q is selected from the group consisting of

[structural diagrams of various Q groups], and

In yet another more specific embodiment, Q is selected from the group consisting of

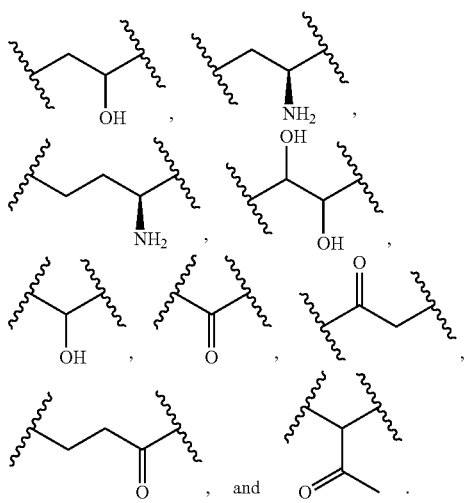

According to one embodiment of the compound of formula (II), at least one $R_1$ is a phenylpropanoid moiety.

According to another embodiment of the compound of formula (II), at least one $R_1$ is a monoterpenoid moiety.

In one specific embodiment, L' is a tricarboxylic acid moiety, and m is 3.

In another specific embodiment, L', and the ester to which it is bound, is a tricarboxylic acid moiety selected from the group consisting of

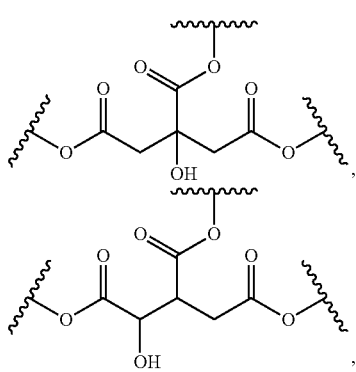

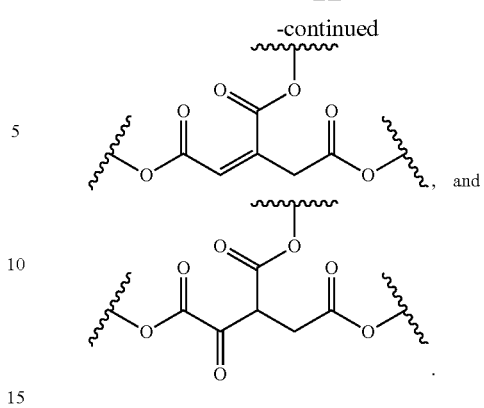

According to one embodiment of the compound of formula (II), L', together with the ester to which it is bound, is a polycarboxylic acid moiety, where the number of carboxylic acid moieties is a number greater than m, such that one or more carboxylic acid moieties are non-esterified.

In one specific embodiment, m is 2, L' is a tricarboxylic acid moiety, and the non-esterified carboxylic acid is protonated or is a carboxylate salt. Suitable non-esterified carboxylic acids include, without limitation, a carboxylate salt with a sodium, potassium, calcium, magnesium, iron, zinc, copper, or amine counterion. The non-esterified carboxylic acid may be a carboxylate salt with an amine selected from the group consisting of ammonia, diethylamine, triethylamine, and methylamine.

In another specific embodiment, L', together with the ester to which it is bound, is a carboxylic acid moiety having at least 4 carboxylic acid groups.

In yet another specific embodiment, m is 4-6.

In one embodiment, the one or more non-esterified carboxylic acid moieties are carboxylate salts. Suitable carboxylate salts include, without limitation, a sodium, potassium, calcium, magnesium, iron, zinc, copper, or amine counterion.

In one embodiment of the compound of formula (II), m is 4-6.

Compounds of formula (II) include, without limitation, the specific compounds set forth in the following Table 1.

TABLE 1

Exemplary Compounds of Formula (II)

| | Compound Name | Compound Structure |
|---|---|---|
| 2028 | digeranyl succinate | |
| 1029 | dicinnamyl adipate | |

TABLE 1-continued

Exemplary Compounds of Formula (II)

| | Compound Name | Compound Structure |
|---|---|---|
| 1031 | dithymyl adipate | |
| 1049A | dithymyl succinate | |
| 1051A | dieugenyl succinate | |
| 1049B | dimenthyl succinate | |

According to another embodiment of this aspect, the compound has a structure of formula (III)

(III)

where
 $R_1$ is each independently a phenylpropanoid or monoterpenoid moiety
 L' is selected from the group consisting of branched or unbranched saturated or unsaturated alkyl or cycloalkyl, aryl, and heteroaryl; and
 m is from 2-6.

In a specific embodiment of the compound of formula (III), m is 2.

It will be appreciated by a person of ordinary skill in the art that when m is 2, then the compound of formula (III) has a structure

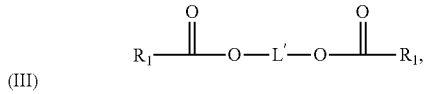

and when m is 3, then the compound of formula (III) has a structure

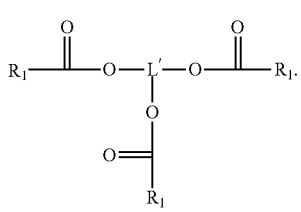

In a more specific embodiment of the compound of formula (III), L' is selected from the group consisting of

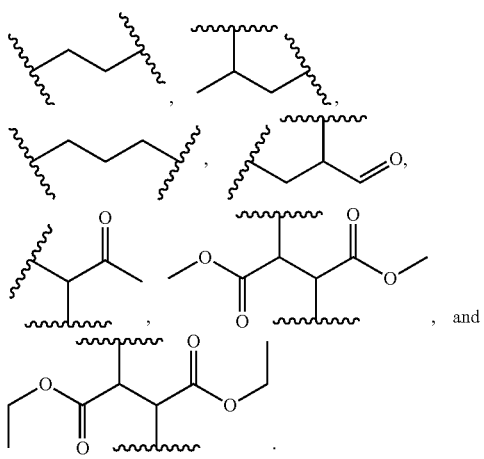

In another specific embodiment of the compound of formula (III), m is 3.

In a more specific embodiment, L' is selected from the group consisting of

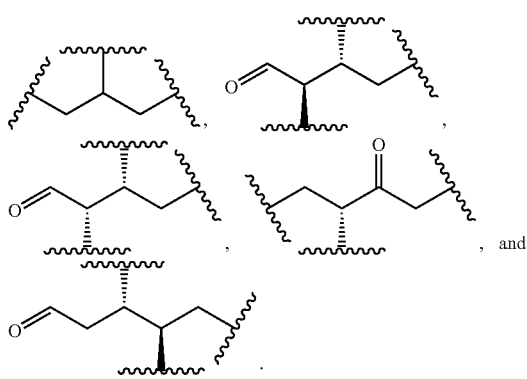

In yet another specific embodiment of the compound of formula (III), L' is a monosaccharide moiety and two or more hydroxyl groups of the monosaccharide moiety that form an ester with $R_1$ are not part of L'.

In a more specific embodiment, the monosaccharide moiety is a pentose selected from the group consisting of arabinose, lyxose, ribose, xylose, ribulose, and xylulose.

In another more specific embodiment, the monosaccharide moiety is a hexose selected from the group consisting of allose, altrose, glucose, mannose, gulose, talose, idose, sorbose, fructose, psicose, and tagatose.

In another specific embodiment of the compound of formula (III), L' is a disaccharide moiety, and hydroxyl groups of the disaccharide moiety that form an ester with $R_1$ are not part of L'.

In a more specific embodiment, the disaccharide moiety is selected from the group consisting of sucrose, maltose, and lactose.

In a specific embodiment of the compound of formula (III), L' is a sugar alcohol moiety, and hydroxyl groups of the sugar alcohol moiety that form an ester with $R_1$ are not part of L'.

In a more specific embodiment, the sugar alcohol is selected from the group consisting of sorbitol, inositol, erythritol, ribitol, threitol, arabitol, and xylitol.

In a specific embodiment of the compound of formula (III), at least one $R_1$ is an acyclic monoterpenoid moiety selected from the group consisting of

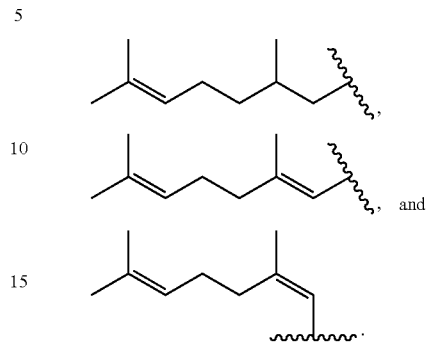

In a specific embodiment of the compound of formula (III), at least one $R_1$ is a mono- or bicyclic monoterpenoid moiety selected from the group consisting of

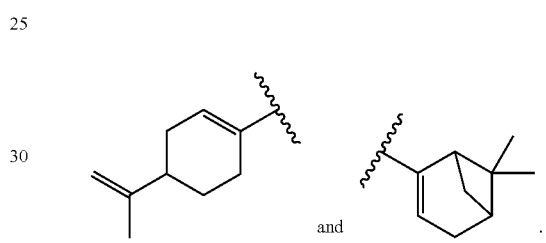

In a specific embodiment of the compound of formula (III), at least one $R_1$ has the following structure:

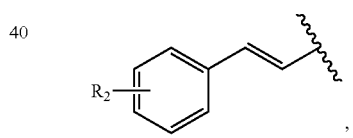

where $R_2$ is H, OH, OMe, or OEt.

In a specific embodiment of the compound of formula (III), at least one $R_1$ has the following structure:

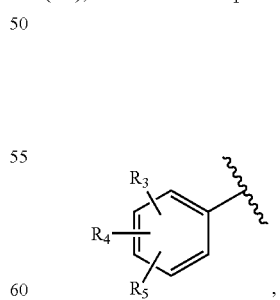

where $R_3$ is OH, OMe, or OEt;

$R_4$ is H, OH, or OMe; and $R_5$ is H, OH, or OMe.

In a more specific embodiment, at least one $R_1$ is selected from the group consisting of
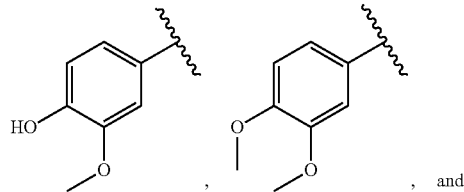, and 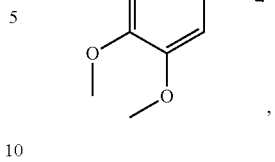,
Compounds of formula (III), without limitation, the specific compounds set forth in the following Table 2.
TABLE 2
Exemplary Compounds of Formula (III)
| | Compound Name | Compound Structure |
|---|---|---|
| 1025 | ethylene dicitronellate | |
| 1026 | ethylene dicinnamate | |
| 1027 | hexacitronelloylinositol | |

TABLE 2-continued
Exemplary Compounds of Formula (III)
| Compound Name | Compound Structure |
|---|---|
| 1032A tricinnamoylglycerol | 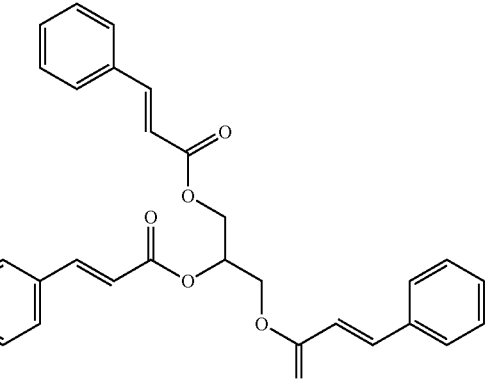 |
| 1063A dicitronelloylhydroquinone | 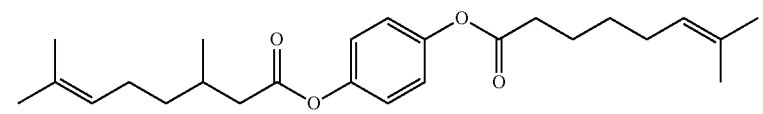 [SMILES: CC(C)=CCCCCC(=O)Oc1ccc(OC(=O)CC(C)CCC=C(C)C)cc1] |
| 1032B hexacinnamoylinositol | 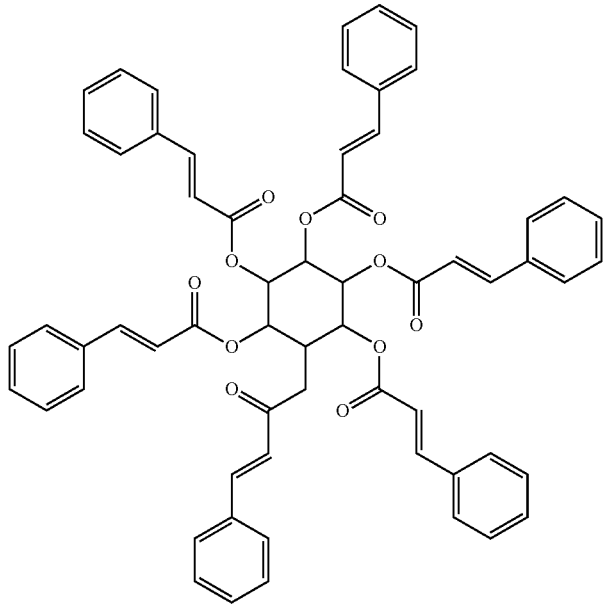 [SMILES: O=C(/C=C/c1ccccc1)CC1C(OC(=O)/C=C/c2ccccc2)C(OC(=O)/C=C/c2ccccc2)C(OC(=O)/C=C/c2ccccc2)C(OC(=O)/C=C/c2ccccc2)C1OC(=O)/C=C/c1ccccc1] |
| 1044F1 tricitronelloylglycerol | 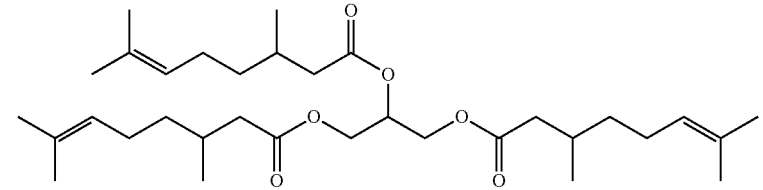 |
| 1044F2 dicitronelloylglycerol | 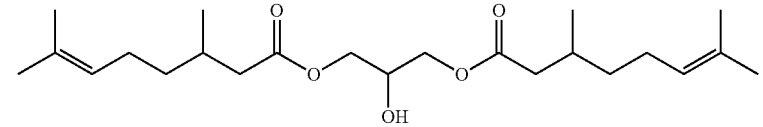 [SMILES: CC(C)=CCCC(C)CC(=O)OCC(O)COC(=O)CC(C)CCC=C(C)C] |

Another aspect of the disclosed embodiments relates to a compound of formula (IV):

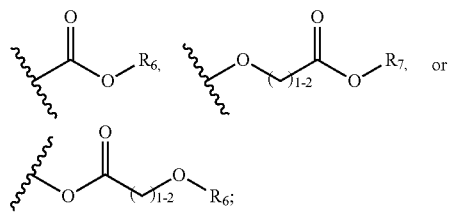

where
A is —O—R$_7$,

R$_6$ is a phenylpropanoid or monoterpenoid moiety;
R$_7$ is a phenylpropanoid or monoterpenoid moiety or is selected from the group consisting of H, M, substituted or unsubstituted C$_3$-C$_7$, unbranched or branched alkyl, substituted or unsubstituted C$_2$-C$_7$ unbranched or branched alkenyl, substituted or unsubstituted C$_3$-C$_7$ unbranched or branched alkynyl, substituted or unsubstituted C$_3$-C$_7$ unbranched or branched cycloalkyl, substituted or unsubstituted heteroaryl, and substituted or unsubstituted C$_3$-C$_7$ unbranched or branched cycloalkenyl; and
M is a counterion selected from the group consisting of sodium, potassium, calcium, magnesium, iron, zinc, copper, and an amine;
In one embodiment of the compound of formula (IV), R$_7$ is H.
In another embodiment of the compound of formula (IV), A is

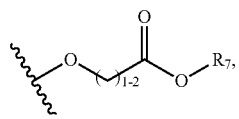

the carbon in the parentheses is 1, and R$_7$ is H.
In yet another embodiment of the compound of formula (IV), R$_7$ is C$_3$-C$_7$ branched alkyl selected from the group consisting of

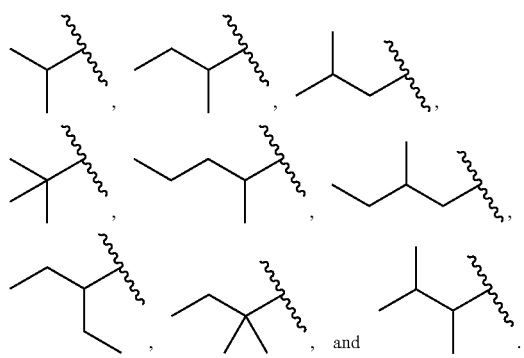

In another embodiment of the compound of formula (IV), R$_7$ is C$_2$-C$_7$ unbranched or branched alkenyl selected from the group consisting of

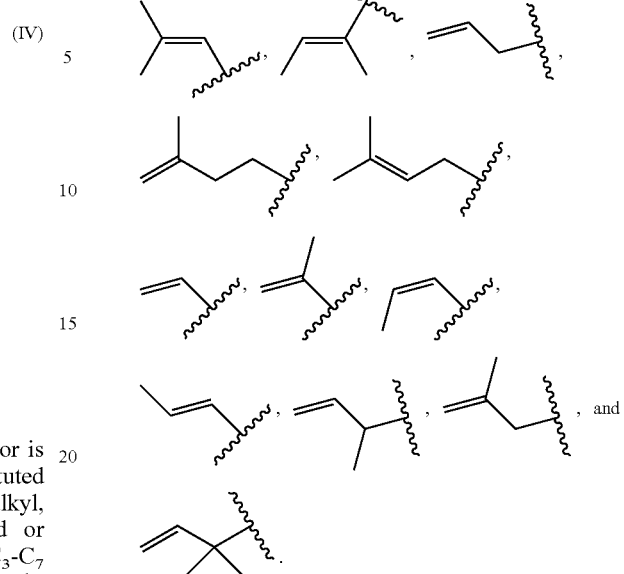

In another embodiment of the compound of formula (IV), R$_7$ is C$_3$-C$_7$ unbranched or branched alkynyl selected from the group consisting of In another embodiment of the compound of formula (IV), R$_7$ is C$_3$-C$_7$ unbranched or branched cycloalkyl selected from the group consisting of

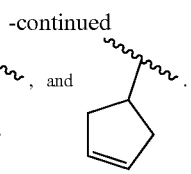, and

In another embodiment of the compound of formula (IV), R₇ is:

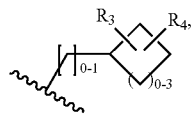

where $R_3$ and $R_4$ are independently selected from the group consisting of H, methyl, ethyl, propyl, isopropyl, vinyl, allyl, and propargyl.

In more specific embodiments, $R_3$ and $R_4$ are both H; $R_3$ and $R_4$ are both CH₃; $R_3$ is CH₃ and $R_4$ is H; or $R_3$ is allyl and $R_4$ is H.

In another embodiment of the compound of formula (IV), R₇ is:

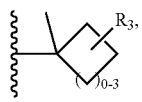

where $R_3$ is selected from the group consisting of H, methyl, ethyl, propyl, isopropyl, vinyl, allyl, and propargyl.

In another embodiment of the compound of formula (IV), Re is a phenylpropanoid moiety.

In yet another embodiment of the compound of formula (IV), $R_6$ is a monoterpenoid moiety.

In a more specific embodiment, the monoterpenoid moiety is selected from the group consisting of

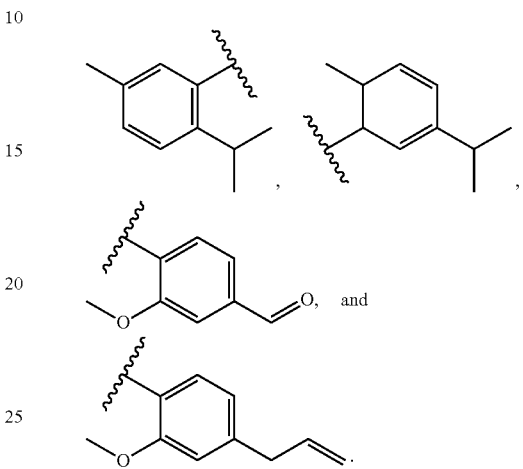

In another embodiment of the compound of formula (IV), $R_7$ is selected from the group consisting of methyl, ethyl, isopropyl, propyl, isobutyl, butyl, and tert-butyl.

Compounds of formula (IV) include, without limitation, the specific compounds set forth in the following Table 3.

TABLE 3

Exemplary Compounds of Formula (IV)

| | Compound Name | Compound Structure |
|---|---|---|
| 1087 | cinnamyl citronellyl ether | |
| 123B | carvacrol eugenyloxyacetate | |
| 2016 | geranyl thymyloxyacetate | |

TABLE 3-continued

Exemplary Compounds of Formula (IV)

| Compound Name | Compound Structure |
|---|---|
| 106 thymyloxyacetic acid | |
| 109 eugenyloxyacetic acid | |
| 2284 eugenyl hydrogen succinate | |
| 2285 thymyl hydrogen succinate | |
| 2286 carvacryl hydrogen succinate | |
| 1097 cinnamyl hydrogensuccinate | |
| 1098B thymyl hydrogensuccinate | |

TABLE 3-continued

Exemplary Compounds of Formula (IV)

| | Compound Name | Compound Structure |
|---|---|---|
| 2283 | ethyl thymyloxyacetate | |
| 2283 | ethyl carvacryloxyacetate | |
| 2288A | isopropyl carvacryloxyacetate | |
| 2289 | amyl thymyloxyacetate | |
| | Thymyloxyacetic acid (2-(2-isopropyl-5-methylphenoxy)acetic acid) | |
| | Carvacryloxyacetic acid (2-(5-isopropyl-2-methylphenoxy)acetic acid) | |
| | Eugenyloxyacetic acid (2-(4-allyl-2-methoxyphenoxy)acetic acid) | |

TABLE 3-continued

Exemplary Compounds of Formula (IV)

| Compound Name | Compound Structure |
| --- | --- |
| Vanillyloxyacetic acid (2-(4-formyl-2-methoxyphenoxy)acetic acid) | |
| Carboxymethylvanillic acid (4-(carboxymethoxy)-3-methoxybenzoic acid) (from vanillic acid) | |
| Salicyloxyacetic acid (2-(2-formylphenoxy)acetic acid) | |
| Carboxymethylsalicylic acid (2-(carboxymethoxy)benzoic acid) (from salicylic acid) | |
| 2-(2-(methoxycarbonyl)phenoxy)acetic acid (from methyl salicylate) | |
| 3-(4-(carboxymethoxy)-3-methoxyphenyl)acrylic acid (from ferulic acid) | |
| 3-(4-(carboxymethoxy)phenyl)acrylic acid (from p-coumaric acid) | |
| coumarin-7-oxyacetic acid (2-((2-oxo-2H-chromen-7-yl)oxy)acetic acid) (from umbelliferone) | |

TABLE 3-continued

Exemplary Compounds of Formula (IV)

| Compound Name | Compound Structure |
| --- | --- |
| 2-(4-acetylphenoxy)acetic acid (from piceol/4'-hydroxyacetophenone) | |
| 1055C citronellyl citronellate | |
| 1053 piperonyl citronellate | |
| 1060A thymyl citronellate | |
| 1062A eugenyl citronellate | |
| 1077A thymyl cinnamate | |
| 1079B carvacryl citronellate | |
| 1085A citronellylmyristate | |
| 1085B citronellylmyristate | |

TABLE 3-continued

Exemplary Compounds of Formula (IV)

| Compound Name | | Compound Structure |
|---|---|---|
| 1085C | menthylmyristate | 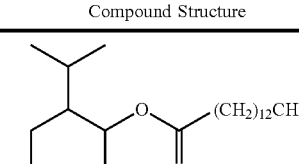 |

According to one embodiment, compounds of formula (IV) that have a free carboxylic acid can have each acid esterified, or the carboxylic acid can be used to form a carboxylate salt.

In one embodiment, compounds of formula (IV) include the specific structures identified in Table 3 other than thymyloxyacetic acid, carvacryloxyacetic acid, and eugenyloxyacetic acid.

Another aspect of the disclosed embodiments relates to a compound of formula (V):

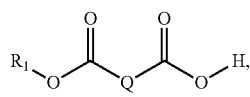

(V)

where $R_1$ is a phenylpropanoid or monoterpenoid moiety and

Q is selected from the group consisting of branched or unbranched saturated or unsaturated $C_0$-$C_4$ alkyl, branched or unbranched $C_0$-$C_4$ ketone, and branched or unbranched $C_0$-$C_4$ amine.

In one embodiment, Q is —$(CH_2)_n$—, and n is from 0 to 4.

In another embodiment, Q is selected from the group consisting of

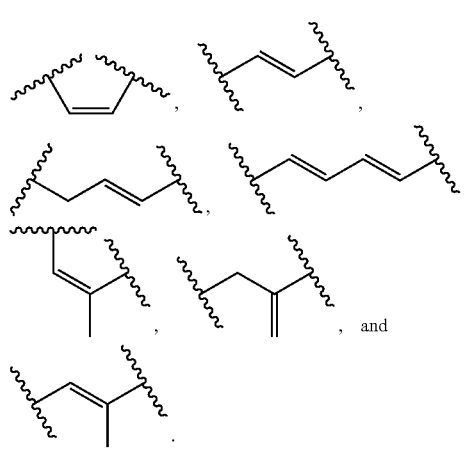

In yet another embodiment, Q is selected from the group consisting of

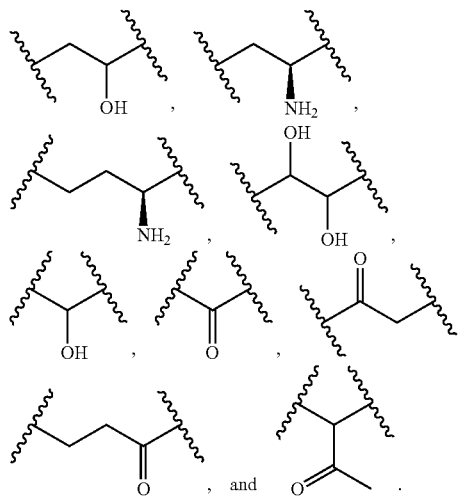

A further aspect of the disclosed embodiments relates to a method of making a compound having a structure of formula (II):

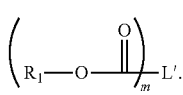

(II)

This method involves reacting
$R_1$—OH with L'-(COOH)$_m$ or
$R_1$—OH with

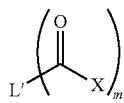

under conditions effective to form a compound having a structure of formula (II), where $R_1$ is each independently a monoterpenoid or phenylpropenoid moiety;

L' is selected from the group consisting of branched or unbranched saturated or unsaturated alkyl or cycloalkyl, aryl, and heteroaryl;

X is halogen; and m is from 2-6.

In one embodiment, this method involves reacting two or more equivalents of $R_1$—OH with L'-(COOH)$_m$ or two or more equivalents of

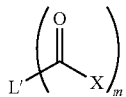

under conditions effective to form a compound having a structure of formula (II).

Another aspect of the disclosed embodiments relates to a method of making a compound having a structure of formula (III):

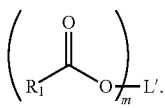
(III)

This method involves reacting
  $R_1$—COOH with L'-(OH)$_m$ or

with L'-(OH)$_m$
under conditions effective to form a compound having the structure of

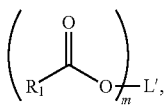

where
  $R_1$ is each independently a phenylpropanoid or monoterpenoid moiety;
  L' is selected from the group consisting of branched or unbranched saturated or unsaturated alkyl or cycloalkyl, aryl, and heteroaryl; and
  m is from 2-6.

In one embodiment, this method involves reacting two or more equivalents of $R_1$—COOH with L'-(OH)$_m$ or two or more equivalents of

with L'-(OH)$_m$ under conditions effective to form a compound having a structure of formula (III).

As noted supra, the certain example compounds may be derived from a biorational source, such as a plant volatile or as a constituent of plant essential oils obtained from the leaf tissue, stem tissue, root tissue, or mixture thereof.

In another embodiment, the monoterpenoids used for synthesis to obtain a higher molecular weight, higher polarity, or decreased volatility are obtained from a synthetic source.

As noted supra, certain compounds are derivatives of monoterpenoids or phenylpropanoids. By way of a non-limiting example, a compound of the present disclosure may be a derivative of an alcohol-containing monoterpenoid or phenylpropanoid, such as, e.g., thymol

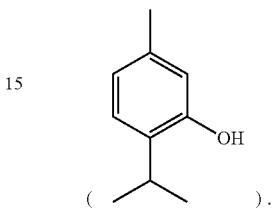

In one example embodiment, a thymol-derivative has the structure

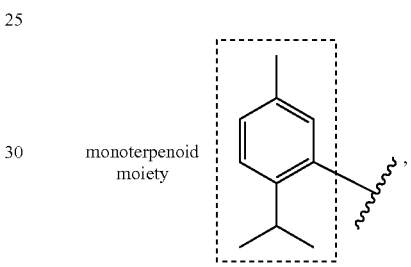

where the 10-carbon skeleton of thymol makes up the monoterpenoid or monoterpenoid moiety (e.g., $R_1$ of formula (I)), and the wavy line, ⌇, represents the linkage to the rest of the molecule (e.g., L of formula (I)).

By way of another non-limiting example, a compound may be a derivative of a carboxylic acid-containing monoterpenoid or phenylpropanoid, such as, e.g., citronellic acid

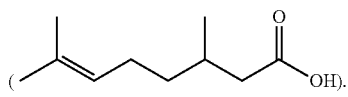

In another example embodiment, a citronellic acid derivative has the structure

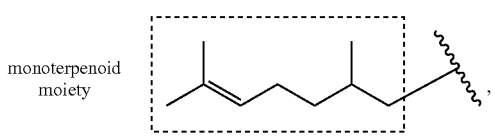 [SMILES: *CC(C)CCC=C(C)C]

where the 9-carbon skeleton of citronellic acid (excluding the carboxylic acid carbon) makes up the monoterpenoid or monoterpenoid moiety and the wavy line, ⌇, represents the linkage to the rest of the molecule (e.g., L of Formula (I)). Thus, the ester direction (i.e., whether L is

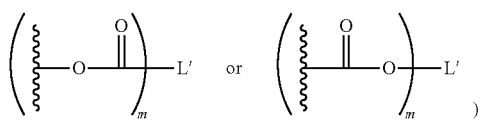

is dictated by the monoterpenoid or phenylpropanoid precursor (e.g., thymol or citronellic acid) used herein.

Thus, the example compounds may be derived from monoterpenoid alcohols (i.e., monoterpenoids containing a hydroxyl group) or from monoterpenoid carboxylic acids (i.e., monoterpenoids containing a carboxylic acid). Alternatively, the compounds may be derived from phenylpropanoid alcohols (i.e., phenylpropanoids containing a hydroxyl group) or from phenylpropanoid carboxylic acids (i.e., phenylpropanoids containing a carboxylic acid).

A further aspect of the disclosed embodiments relates to a pesticidal composition comprising the compounds of formula (IV) and a carrier. In one embodiment, the composition comprises a subset of compounds of formula (V) and a carrier. For example, and without limitation, the composition comprises a compound of formula (IV), where A is

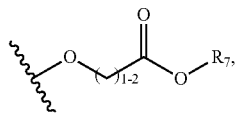

the carbon in the parentheses is 1, and $R_7$ is H.

In a more specific embodiment, compounds useful in the insecticidal baits composition include, without limitation, any one or more of the exemplary compounds set forth in Table 4.

TABLE 4

Pesticidal Compounds

| Compound Name | Compound Structure |
|---|---|
| Thymyloxyacetic acid (2-(2-isopropyl-5-methylphenoxy)acetic acid) | |
| Carvacryloxyacetic acid (2-(5-isopropyl-2-methylphenoxy)acetic acid) | |
| Eugenyloxyacetic acid (2-(4-allyl-2-methoxyphenoxy)acetic acid) | |
| Vanillyloxyacetic acid (2-(4-formyl-2-methoxyphenoxy)acetic acid) | |
| Carboxymethylvanillic acid (4-(carboxymethoxy)-3-methoxybenzoic acid) (from vanillic acid) | |
| Salicyloxyacetic acid (2-(2-formylphenoxy)acetic acid) | |

TABLE 4-continued

Pesticidal Compounds

| Compound Name | Compound Structure |
|---|---|
| Carboxymethylsalicylic acid (2-(carboxymethoxy)benzoic acid) (from salicylic acid) | |
| 2-(2-(methoxycarbonyl)phenoxy)acetic acid (from methyl salicylate) | |
| 3-(4-(carboxymethoxy)-3-methoxyphenyl)acrylic acid (from ferulic acid) | |
| 3-(4-(carboxymethoxy)phenyl)acrylic acid (from p-coumaric acid) | |
| coumarin-7-oxyacetio acid (2-((2-oxo-2H-chromen-7-yl)oxy)acetic acid) (from umbelliferone) | |
| 2-(4-acetylphenoxy)acetic acid (from piceol/4'-hydroxyacetophenone) | |

The compounds identified in Table 4 are indicated as free carboxylic acids. However, each acid can be esterified or used to form a carboxylate salt.

In a specific embodiment, suitable esters include, without limitation, methyl, ethyl, propyl, isopropyl, butyl, isobutyl, sec-butyl, tert-butyl, amyl esters.

In another specific embodiment, suitable carboxylate salts include, without limitation, metal salts, including sodium, potassium, calcium, and magnesium.

In yet another specific embodiment, suitable compounds identified in Table 4 are diacids, including diesters and divalent anionic salts.

Another aspect of the disclosed embodiments relates to an insecticide composition comprising a compound of formula (I), (IV), or (V) and a carrier.

Yet another aspect relates to a pesticidal bait comprising insecticidal compounds and/or compositions of the example embodiments.

Another aspect of the disclosed embodiments relates to a method of killing an insect. This method involves providing the insecticide composition in a location to attract an insect. The insect is attracted to the bait, consumes the bait, and is killed by the consumed insecticide composition.

It has been determined that many monoterpenoids are toxic if topically applied to insects, injected, or applied to a surface in which insects will come in contact. Unfortunately, many of these compounds are far too repellent to be included in attractive baits. By decreasing the volatility of these molecules by means of increasing the molecular weight or polarity of these relatively volatile compounds by synthetic chemistry processes, there may be potential for these compounds to become less repellent, encouraging ingestion by various pest insects. Once ingested, these compounds (through hydrolysis of the ester bond, according to one embodiment) are toxic. These compounds provide a biorational alternative to many of the currently available toxic bait formulations on the market, which primarily contain synthetic insecticides.

Monoterpenoid derivative compounds of the disclosed embodiments have an increased molecular weight, higher polarity, or decreased volatility than currently available naturally/synthetically-derived monoterpenoid compounds that have been demonstrated to be insecticidal when combined with various insect diets in laboratory testing. These novel monoterpenoid derivative compounds can effectively kill insect pests when presented in a formulated attractive bait or presented as a toxic food alternative.

These attractive toxic bait formulations would be presented to insects in a variety of residential and commercial environments relevant to the insect pest in question, including but not limited to, living quarters, homes, restaurants, commercial buildings, greenhouses, garages, grain storage units, barracks, farms, barns, and other places and instances where insect pests may feed on a toxic attractive bait with the intention of controlling the pest populations.

In one embodiment, the composition includes the insecticidal compound incorporated into an appropriate bait. In this context, the term "carrier" is meant to include the bait.

As used herein, the term "bait" is meant any substance which will entice, induce, compel, or otherwise cause the insect to ingest the insecticidal composition by any physiological mechanism. Accordingly, any substance which will entice, induce, compel, or otherwise cause the insect to eat the insecticidal composition through appeal to its sense of taste, smell, sight, or touch, would be within the meaning and intent of the insecticidal compositions. This would include incorporating the insecticidal compound into a matrix that would encourage an insect pest to feed on it. Moreover, these compounds represent palatable compounds and could be provided to the insect as is. This would also function as a bait.

Suitable baits include, without limitation, alfalfa meal, beef fat, blood meal, bacon, beef bouillon, corn meal, casein, corn, cotton seed meal, chicken feed, dog food, dried apple, egg, fish meal, flour, honey, meat, oats, peanuts, peanut butter, peanut meal, raisins, sausage, sawdust, sugar, soybean meal, tankage, wheat, bran, whey, cattle feed, bread, crackers, St. John's bread, chocolate, dog biscuits, packing house wastes, grain, seeds, butter, bacon drippings, corn oil, soft drink syrup, cotton seed oil, lard, chocolate syrup, molasses, sugar syrup, peanut oil, vegetable oil, corn protein hydrolysate, soups and bouillons, mayonnaise, milk, cream, and aromatic natural oils.

The choice of bait may depend on the specific pest targeted, if known. For example, an ordinary household ant may prefer sugar and other sugar-containing materials of this nature for ant control. On the other hand, cockroaches, being relatively omnivorous, may be attracted to most of the baits listed supra and the specific choice of bait may not be critical.

Where the identity of the insect or insects is not known, a mixture of several different baits may be preferred until, for example, the preference of the targeted pest species is identified and the bait can be more appropriately targeted to the target pest.

In the insecticidal compositions, the concentration of the toxic compound may be included in the composition in an amount of about 0.01% w/w up to about 1%, 2%, 3%, 4%, 5%, 10%, 15%, 20%, 30%, 40%, or about 50% w/w or more of the composition, and all subranges therebetween.

In carrying out the method of killing an insect, the composition may be distributed by dividing the bait into small quantities in an area targeted by the insect.

In carrying out the method of killing an insect, locations to attract insects may include target areas such as residential and commercial structures and facilities (including agricultural fields), cupboards, containers, houses, yards, gardens, and so forth. Thus, target areas can include inanimate objects in the vicinity of a target area, including but not limited to, plants, articles of clothing, premises, tents, pillows, bed nets, blankets, automobiles, etc.

Target pests for killing with the insecticidal compositions include, without limitation, blood-sucking insects, biting insects, cockroaches, mosquitoes, blackfly, fleas, house flies, barn fly, face fly, bush fly, deer fly, horse fly, gnats, beetle, beer bug, louse, bed bug, termite, earwig, ant, aphid, spruce bud worm, corn borer, sand flea, tsetse fly, assassin bug, biting flies, sand fly, stored grain pests (e.g., maize weevil, red flour beetle, saw-toothed grain beetle, Indian meal moth), clothes moths, ticks, mites, spiders, phytophagous pests, hematophagous pests, and other arthropod pests.

By "insect" it is meant not only the classical definition of small invertebrate animals having three clearly defined body segments, including head, thorax, and abdomen, with only three pair of legs, and sometimes with wings, such as beetles, bugs, bees, flies, mosquitoes, and the like, but also encompasses other allied classes of arthropods or other invertebrate pests whose members are wingless and usually have greater or fewer than six legs, for example, spiders, ticks, mites, centipedes, wood lice, nematodes, and the like.

The composition according to this aspect of the disclosed embodiments may be formulated into any suitable form including, without limitation, a solution, emulsion, emulsifiable concentrate, suspension, foam, paste, aerosol, suspoemulsion concentrate, or slurry. Suitable compositions include those for HV, LV, and ULV spraying and for ULV cool and warm fogging formulations. In one particular embodiment, the composition is formulated in a manner suitable for large or small scale agricultural and horticultural applications. Solid compositions are also suitable forms, such as cake, powder, or dusts.

These formulations are produced in a known manner, for example, by mixing a liquid composition with extenders, that is, liquid solvents, liquefied gases under pressure, and/or solid carriers. Wetting agents and/or surfactants, that is, emulsifiers and/or dispersants, sequestering agents, plasticizers, brighteners, flow agents, coalescing agents, waxes, fillers, polymers, anti-freezing agents, biocides, thickeners, tackifiers, and/or foam formers and defoaming agents may also be used in manners commonly known by those of ordinary skill in the art. If the extender used is water, it is also possible to employ, for example, organic solvents as auxiliary solvents. Other possible additives are mineral and vegetable oils, colorants such as inorganic pigments, and trace nutrients.

Example embodiments include pesticidal formulations where the compounds disclosed herein are encapsulated. The expression "encapsulated" or "encapsulation" or any lingual variation thereof refers herein to a granule of any shape and size, which is capable of holding therein one or more compounds disclosed herein. One non-limiting example of such encapsulation is microencapsulation. The suitable microcapsule is one having from 30 to 98% or more of its weight a compound disclosed herein and may be prepared by, for example, interfacial polymerization of isocyanates or other suitable encapsulating material to afford a microencapsulating shell. Such a microcapsule may have an average size of between 0.1 and 1,000 microns.

The nature and action of such additives are well-known to those of ordinary skill in the art of liquid formulations. Additives should not interfere with the compound or any other biologically active component included in the formulation.

In one embodiment, the active compound content of the formulation is in a concentration of active compound from about 0.0000001 to 20% by weight, or from about 0.0001 to 15% by weight.

Insecticidal compounds may also be incorporated in a bait matrix and deployed in a bait station. These stations include housing the insecticidal compound and bait matrix in a container to protect it from the environment. Insects would be attracted to this bait station and would be able to feed on the insecticidal baits. These bait stations may utilize various attractant sources to entice pest insects to feed. These attractant sources may include, for example, pheromones, $CO_2$, or wood to encourage pest insects to visit the bait station prior to feeding on the insecticidal bait. Any form of physical or chemical attractant could be utilized in this bait station method.

A variety of fungicides may be used as preservatives in these insecticidal bait formulations. They include, for example, those classified and listed by the Fungicide Resistance Action Committee (FRAC), *FRAC CODE LIST 1: Fungicides sorted by FRAC Code*, December 2006, which is hereby incorporated by reference in its entirety. A summary of this list includes: Methyl benzimidazole carbamates (MBC): e.g., benzimidazoles and thiophanates; Dicarboximides; Demethylation inhibitors (DMI) (SBI: Class I): e.g., imidazoles, piperazines, pyridines, pyrimidines, and triazoles; Phenylamides (PA): e.g., acylalanines, oxazolidinones, and butyrolactones; Amines (SBI: Class II): e.g., morpholines, piperidines, and spiroketalamines; Phosphoro-thiolates and Dithiolanes; Carboxamides: e.g., benzamides, furan carboxamides, oxathiin carboxamides, thiazole carboxamides, pyrazole carboxamides, and pyridine carboxamides; Hydroxy-(2-amino-)pyrimidines; Anilino-pyrimidines (AP); N-phenyl carbamates; Quinone outside inhibitors (QoI): e.g., methoxyacrylates, methoxy-carbamates, oximino acetates, oximino-acetamides, oxazolidine-diones, dihydro-dioxazines, imidazolinones, and benzyl-carbamates; Phenylpyrroles; Quinolines; Aromatic hydrocarbons (AH) and Heteroaromatics I: e.g., 1,2,4-thiadiazoles; Cinnamic acids; Melanin biosynthesis inhibitors-reductase (MBI-R): e.g., isobenzofuranone, pyrroloquinolinone, and triazolobenzo-thiazole; Melanin biosynthesis inhibitors-dehydratase (MBI-D): e.g., cyclopropane-carboxamide, carboxamide, and propionamide; Hydroxyanilides (SBI: Class III); Hydroxyanilides (SBI: Class IV): e.g., thiocarbamates and allylamines; Polyoxins: e.g., peptidyl pyrimidine nucleoside; Phenylureas; Quinone inside inhibitors (QiI): e.g., cyanoimidazole and sulfamoyl-triazoles; Benzamides: e.g., toluamides; Antibiotics: e.g., enopyranuronic acid, hexopyranosyl, streptomycin, and validamycin; Cyanoacetamide-oximes; Carbamates; Dinitrophenyl crotonates; Pyrimidinone-hydrazones; 2,6-dinitro-anilines; Organo tin compounds: e.g., tri phenyl tin compounds; Carboxylic acids; Heteroaromatics II: e.g., isoxazoles and isothiazolones; Phosphonates: e.g., ethyl phosphonates and phosphorous acid and salts; Phthalamic acids; Benzotriazines; Benzene-sulfonamides; Pyridazinones; Thiophene-carboxamides; Pyrimidinamides; CAA-fungicides (Carboxylic Acid Amides): e.g., cinnamic acid amides, valinamide carbamates and mandelic acid amides; Tetracycline; Thiocarbamate; Benzamides: e.g., acylpicolides; Host plant defense inducers: e.g., benzo-thiadiazole BTH, benzisothiazole and thiadiazole-carboxamides; Unclassified materials: e.g., thiazole carboxamide, phenyl-acetamide, quinazolinone, and benzophenone; Multi-site contact materials: e.g., copper salts, sulfur, dithiocarbamates and relatives, phthalimides, chloronitriles (phthalonitriles), sulphamides, guanidines, triazines, and quinones (anthraquinones); Non-classified materials: e.g., mineral oils, organic oils, potassium bicarbonate, and biological materials. Those skilled in the art will recognize that other fungicides may be formulated or co-administered with various example embodiments disclosed herein.

In one embodiment, the composition is microencapsulated in a polymeric substance. Examples of suitable microencapsulation materials include the following classes of materials for which representative members are provided. It will be apparent to those skilled in the art that other classes of materials with polymeric properties may be used and that other materials within each given class and others polymeric classes may be used for microencapsulation. In this description, microencapsulation is taken to include methods and materials for nanoencapsulation. Examples include but are not limited to: gums and natural macromolecules: such as, gum arabic, agar, sodium alginate, carageenan, and gelatin; carbohydrates: such as, starch, dextran, sucrose, corn syrup, and β-cyclodextrin; celluloses and semisynthetic macromolecules: such as, carboxymethylcellulose, methycellulose, ethylcellulose, nitrocellulose, acetylcellulose, cellulose acetate-phthalate, cellulose acetate-butylate-phthalate, epoxy, and polyester; lipids: such as wax, paraffin, stearic acid, monoglycerides, phospholipids, diglycerides, beeswax, oils, fats, hardened oils, and lecithin; inorganic materials: such as, calcium sulfate, silicates, and clays; proteins: such as, gluten, casein, gelatin, and albumin; biological materials: such as, voided cells from organisms like baker's yeast and other microorganisms together with other formerly living cell tissues. Furthermore, these materials may be used singly or compounded in the processes of micro- or nano-encapsulation.

It will be understood by all readers of this written description that the example embodiments described herein and claimed hereafter may be suitably practiced in the absence of any recited feature, element or step that is, or is not, specifically disclosed herein. For instance, references in this written description to "one embodiment," "an embodiment," "an example embodiment," and the like, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one of ordinary skill in the art to affect such feature, structure, or characteristic in connection with other embodiments whether or not explicitly described.

All publications and references cited herein, including those in the Background section, are expressly incorporated herein by reference in their entirety. However, if there are any differences between any similar or identical terms found an incorporated publication or reference and those explicitly put forth or defined in this written description, then those terms definitions or meanings explicitly put forth in this written description shall control in all respects. Further, any reference to prior art in this specification is not, and should not be taken as, an acknowledgment or any form of suggestion that such prior art forms part of the common general knowledge in any country.

EXAMPLES

The following examples are provided to illustrate embodiments but they are by no means intended to limit its scope.

Example 1—Chemical Synthesis (Representative Examples)

Diesters, Ethylene Glycol Linker

Ethylene glycol (10 mmol) was dissolved in 50 mL DMF, and DMAP (122 mg, 0.1 eq) and DCC (4.54 g, 2.2 eq) were added. The carboxylic acid (25 mmol) was then added as a solution in chloroform (25 mL) over 5 minutes at 0° C. The reaction was allowed to warm back to room temperature, and was stirred for 3 hours. Water (50 mL) and hexane (50 mL) were then added, and the biphasic mixture was then filtered to remove the bulk of the DCU. The mixture was then separated into organic and aqueous layers, and the aqueous layer was extracted twice more with hexane. The organic layers were combined and washed with water several times to remove all DMF, and then rinsed with 1 M hydrochloric acid, followed by 1 M sodium hydroxide, and then brine, followed by drying over magnesium sulfate. After removal of solvent by rotary evaporation, the compound was purified by column chromatography or recrystallization. 70-90% yield was achieved.

Ethylene Dicinnamate

Cinnamic acid was used. The crude material was recrystallized from isopropanol to give a fluffy white solid (2.88 g, 89%). $^1$H NMR (400 MHz, CDCl$_3$) δ 7.73 (d, J=16.0 Hz, 1H), 7.50 (m, 2H), 7.39 (p, J=3.3, 2.8 Hz, 4H), 6.49 (d, J=16.0 Hz, 1H), 4.50 (s, 2H).

Diesters, Dicarboxylic Acid Linker

Digeranyl Succinate

Succinic acid (0.590 g, 5 mmol) was dissolved in 20 mL DMF, and DMAP (122 mg, 1 mmol) and alcohol (1.62 g, 10.5 mmol) were added and the solution was cooled to 0° C. DCC (2.17 g, 2.1 eq) was dissolved in chloroform (10 mL) and this solution was then added to the reaction mixture over 5 minutes. The reaction was allowed to warm back to room temperature, and was stirred for 3 hours. Water (50 mL) and hexane (50 mL) were then added, and the biphasic mixture was then filtered to remove the bulk of the DCU. The mixture was then separated into organic and aqueous layers, and the aqueous layer was extracted twice more with hexane. The organic layers were combined and washed with water several times to remove all DMF, and then rinsed with 1 M hydrochloric acid, followed by 1 M sodium hydroxide, and then brine, followed by drying over magnesium sulfate. After removal of solvent by rotary evaporation, the compound was purified by column chromatography to yield a colorless oil. (0.985 g, 50%). $^1$HNMR (400 MHz, CDCl3) δ 5.33 (t, 1H), 5.07 (t, 1H), 4.61 (d, 2H), 2.62 (s, 4H), 2.12-2.02 (mult, 4H), 1.69 (s, 3H), 1.68 (s, 3H), 1.60 (t, 3H). $^{13}$CNMR (101 MHz, CDCl3) δ 172.31, 142.33, 131.81, 123.70, 118.11, 61.62, 39.51, 29.21, 26.27, 25.66, 17.67, 16.45.

Dieugenyl Succinate

Eugenol (3.45 g, 21 mmol) was dissolved in dichloromethane (40 mL) and cooled to 0° C. Pyridine (2.37 g, 30 mmol) was added, followed by the dropwise addition of succinyl chloride (1.55 g, 10 mmol). After the addition was complete, the reaction was allowed to warm to room temperature, stirred for 15 minutes, and then the reaction was diluted with hexane (100 mL), and water (30 mL) was added. The aqueous layer was removed, and the organic layer was washed with water, then 3M hydrochloric acid, and then 2M sodium hydroxide solution several times to remove most of the color from the organic layer. The organic solution was dried over sodium sulfate, and the solvent was removed under reduced pressure. The crude solid was recrystallized from 95% ethanol to give a light yellow solid. $^1$HNMR (400 MHz, CDCl3) δ 6.96 (dd, 2H), 6.79 (d, 2H), 6.76 (d, 2H), 5.96 (ddt, 2H), 5.12 (dq, 2H), 5.08 (ddt, 2H), 3.80 (s, 6IH), 3.38 (d, 4H), 3.04 (s, 4H). $^{13}$CNMR (101 MHz, CDCl3) δ 170.39, 150.79, 139.03, 137.89, 137.03, 122.51, 120.64, 116.14, 112.69, 55.81, 40.08, 29.12.

Oligoesters of Polyols, General Procedure

The polyol (5 mmol) was dissolved in DMF (50 mL), and DCC (1.1 eq. per hydroxyl group) and DMAP (0.1 eq. per hydroxyl group) were added. The solution was cooled 0° C., and carboxylic acid (1.15 eq. per hydroxyl group) was added over 10 minutes. Water (50 mL) and hexane (50 mL) were then added, and the biphasic mixture was then filtered to remove the bulk of the DCU. The mixture was then separated into organic and aqueous layers, and the aqueous layer is extracted twice more with hexane. The organic layers were combined and washed with water several times to remove all DMF, and then rinsed with 1 M hydrochloric acid, followed by 1 M sodium hydroxide, and then brine, followed by drying over magnesium sulfate. After removal of solvent by rotary evaporation, the compound was purified by column chromatography or recrystallization. For glycerol, the triglyceride is often accompanied with the 1,3-diglyceride, which was easily separated. This trend continued with more alcohol groups; additionally, when a sugar was used as the core, different anomers of the sugar occur.

Tricitronelloylglycerol

General procedure with glycerol and citronellic acid. Colorless oil (1.89 g, 69%). $^1$HNMR (400 MHz, CDCl3) δ 5.21 (p, J=4.6 Hz, 1H), 5.01 (overlapping t, 3H), 4.24 (dtd, J=11.6, 4.6, 2.0 Hz, 2H), 4.08 (dtd, J=11.6, 4.6, 2.0 Hz, 2H), 2.26 (overlapping q, 3H), 2.06 (overlapping q, 3H), 2.00-1.83 (mult, 12H), 1.61 (s, 9H), 1.53 (s, 9H), 1.34-1.10 (overlapping m, 6H), 0.88 (d, 3H), 0.87 (d, 6H).

1,3-Dicitronelloylglycerol

Diacylglycerol isolated from tricitronelloylglycerol synthesis. Colorless oil that solidifies to a white solid (1.89 g, 69%). $^1$HNMR (400 MHz, CDCl3) δ 6.95 (broad s, 1H), 5.09 (t, 2H), 4.30-4.11 (m, 1H), 3.97-3.88 (m, 2H), (3.73-3.63) (m, 2H), 2.41 (dd, 2H), 2.20 (dd, 2H), 2.10-1.71 (mult, 8H), 1.67 (s, 6H), 1.59 (s, 6H), 1.40-1.12 (m, 4H), 0.94 (d, 6H).

Etherified Terpenoids

Eugenyloxyacetic Acid

To a solution of sodium hydroxide (16.8 g, 420 mmol) in 200 mL of water was added eugenol (32.8 g, 200 mmol) and chloroacetic acid (19.4 g, 205 mmol). The clear, brown solution was then heated to reflux for three hours, after which the reaction was cooled and constant-boiling hydrochloric acid is added until the mixture was strongly acidic; eugenyloxyacetic acid separated as an oil that then solidifies. The impure compound was isolated by filtration and then recrystallized from toluene to give beige crystals (28.98 g, 65%). $^1$H NMR (400 MHz, DMSO-d$_6$) δ 12.94 (s, 1H), 6.80 (d, J=2.0 Hz, 1H), 6.77 (d, J=8.2 Hz, 1H), 6.65 (dd, J=8.2, 2.0 Hz, 1H), 5.93 (ddt, J=16.8, 10.0, 6.7 Hz, 1H), 5.07 (dq, J=16.8, 2.0 Hz 1H), 5.02 (ddt, J=10.0, 2.0, 1.3 Hz, 1H), 4.60 (s, 2H), 3.75 (s, 3H), 3.29 (dt, J=6.7, 1.3 Hz, 2H). $^{13}$C NMR (101 MHz, DMSO-d$_6$) δ 170.38, 148.82, 145.53, 137.95, 133.05, 120.08, 115.60, 113.42, 112.69, 65.18, 55.50, 40.15, 39.31.

Methyl Eugenyloxyacetate

Eugenyloxyacetic acid (22.22 g, 100 mmol) was dissolved in methanol (100 mL) in a 250 mL round-bottom flask. Concentrated sulfuric acid (1 mL) was added, and the reaction was heated to reflux for 2 hours. The reaction was then cooled, and water (100 mL) was added. The methyl eugenyloxyacetic acid was extracted from the aqueous layer with hexane. The combined organic layers were washed with water, and then 1 M sodium hydroxide, and then brine, dried over magnesium sulfate, and concentrated under reduced pressure. $^1$H NMR (400 MHz, CDCl$_3$) δ 6.77 (d, J=8.1 Hz, 1H), 6.74 (d, J=1.9 Hz, 1H), 6.69 (dd, J=8.1, 1.9 Hz, 1H), 5.95 (ddt, J=16.9, 9.9, 6.7 Hz, 1H), 5.09 (dq, J=16.9, 1.5 Hz, 1H), 5.06 (ddt, J=9.9, 1.9, 1.5 Hz, 1H), 4.68 (s, 3H), 3.87 (s, 4H), 3.79 (s, 3H), 3.34 (dt, J=6.7, 1.5 Hz, 2H). $^{13}$C NMR (101 MHz, CDCl$_3$) δ 169.63, 149.50, 145.48, 137.40, 134.55, 120.36, 115.81, 114.40, 112.45, 66.64, 55.82, 52.19, 39.83.

Geranyl Thymyloxyacetate

Geraniol (0.771 g, 5 mmol) and thymyloxyacetic acid (1.15 g, 5.5 mmol) were added to a solution of DMAP (61 mg) in chloroform (25 ml). 1-Ethyl-3-(3-dimethylaminopropyl)carbodiimide (EDCI) (1.05 g, 1.1 eq.) was added in one portion at 0° C., and the reaction was stirred for 4 hours at room temperature. The solution was then diluted with 100 mL hexanes, and washed first with water, then with 1 M hydrochloric acid, followed by 1 M sodium hydroxide, and lastly brine. The organic layer was dried over magnesium sulfate, and the solvent was then removed under reduced pressure. The crude material was purified by column (1:9 EtOAc:Hexanes) to give a colorless oil (1.01 g, 59%). $^1$HNMR (400 MHz, CDCl$_3$) δ 7.11 (d, 1H), 6.78 (d, 1H), 6.53 (s, 1H), 5.36 (t, 1H), 5.08 (t, 1H), 4.72 (d, 2H), 4.63 (s, 2H), 3.37 (hept, 1H), 2.29 (2, 3H), 2.13-2.02 (mult., 4H), 1.70 (s, 3H), 1.68 (s, 3H), 1.60 (s, 3H), 1.22 (d, 6H). $^{13}$CNMR (101 MHz, CDCl$_3$) δ 169.4, 155.16, 136.4, 134.7, 132.1, 126.4, 123.8, 122.4, 117.8, 112.5, 65.9, 62.1, 39.7, 26.7, 26.4, 25.8, 22.9, 21.4, 17.8, 16.7.

Thymyl Thymyloxyacetate

Same procedure as above using thymol in lieu of geraniol. Colorless oil (0.872 g, 51%). $^1$HNMR (400 MHz, CDCl$_3$) δ7.32 (d, 1H), 7.18 (d, 1H), 7.07 (d, 1H), 6.89 (s, 1H), 6.86 (d, 1H), 6.71 (d, 1H), 4.94 (s, 2H), 3.45 (hept, 1H), 2.93 (hept, 1H), 2.37 (s, 3H), 2.35 (s, 3H), 1.27 (d, 6H), 1.17 (d, 6H). $^{13}$CNMR (101 MHz, CDCl$_3$) δ 168.3, 155.0, 147.4, 137.1, 136.8, 136.4, 134.7, 127.6, 126.6, 126.5, 122.6, 122.5, 112.2, 65.7, 27.1, 26.7, 23.2, 22.9, 21.4, 20.9.

Carvacryl Eugenyloxyacetate

Same procedure with carvacrol and eugenyloxyacetic acid. Cream-colored flakes. $^1$H NMR (400 MHz, CDCl$_3$) δ 7.13 (d, J=7.8 Hz, 1H), 7.01 (dd, J=7.8, 1.8 Hz, 1H), 6.91 (d, J=8.2 Hz, 1H), 6.86 (d, J=1.8 Hz, 1H), 6.76 (d, J=2.0 Hz, 1H), 6.73 (dd, J=8.2, 2.0 Hz, 1H), 5.96 (ddt, J=16.9, 8.6, 6.8 Hz, 1H), 5.10 (dq, J=8.6, 1.7 Hz, 1H), 5.06 (d, J=1.5 Hz, 1H), 4.94 (s, 2H), 3.89 (s, 3H), 3.35 (dt, J=6.8, 1.5 Hz, 2H), 2.85 (hept, J=7.2 Hz, 1H), 2.09 (s, 3H), 1.21 (dd, J=6.9, 1.5 Hz, 6H). $^{13}$C NMR (101 MHz, CDCl$_3$) δ 167.61, 149.67, 148.67, 148.10, 145.53, 137.39, 134.81, 130.93, 127.02, 124.38, 120.43, 119.54, 115.81, 114.96, 112.67, 66.77, 55.88, 39.82, 33.51, 23.99, 23.85, 15.77.

Example 2—German Cockroach Feeding

Materials and Methods

German Cockroaches

Adult male and female German cockroaches (*Blattella germanica*) were obtained from an established colony in the Department of Entomology's Pesticide Toxicology Laboratory at Iowa State University of Science and Technology (Ames, IA). Insects were kept in a constant 12:12-hour light: dark cycle and fed a diet of dry cat food (Purina® Cat Chow Complete®), rolled oats (HyVEE® Old Fashioned Oats), and Fluker's® Cricket Quencher.

Feeding Assay

Five adult German cockroaches (*Blattella germanica*) were introduced to mason jars with steel mesh at the top to prevent escape. 266.6 mg of crushed Cheerios™ (approximately two cheerios) was mixed with compound at varying concentrations by weight food. If the material was solid, a mortar and pestle was used to homogenize the crushed Cheerios and compound. If the material was a liquid, it was dissolved in acetone and aliquoted into the food slowly until the desired concentration of compound by weight food was achieved. If acetone was used as the carrier throughout the experiment, the food was carefully stirred repeatedly to ensure evaporation so that no more acetone was present in the food. This was done to prevent mortality due to the presence of solvent in the treated food. Controls consisted of food that was treated with approximately 1 mL of just acetone. Acetone in all treatments was allowed to evaporate, so that the solvent did not contribute to mortality. Concentrations used to assess mortality were 3.75% and 15% weight compound by weight food. Total mortality was assessed at 2 weeks after introducing cockroaches into individual mason jars with food treated with different compounds.

Data Analysis

Data is presented as average percentage mortality with the standard error of the mean (SEM). A minimum of three replicates were performed for each compound and a ANOVA with a post-hoc Student Newman-Kuels test was performed to compare individual treatments to the control (α=0.05). An asterisk represents higher percentage mortality that was statistically significant from the control.

Results

Figure 2:
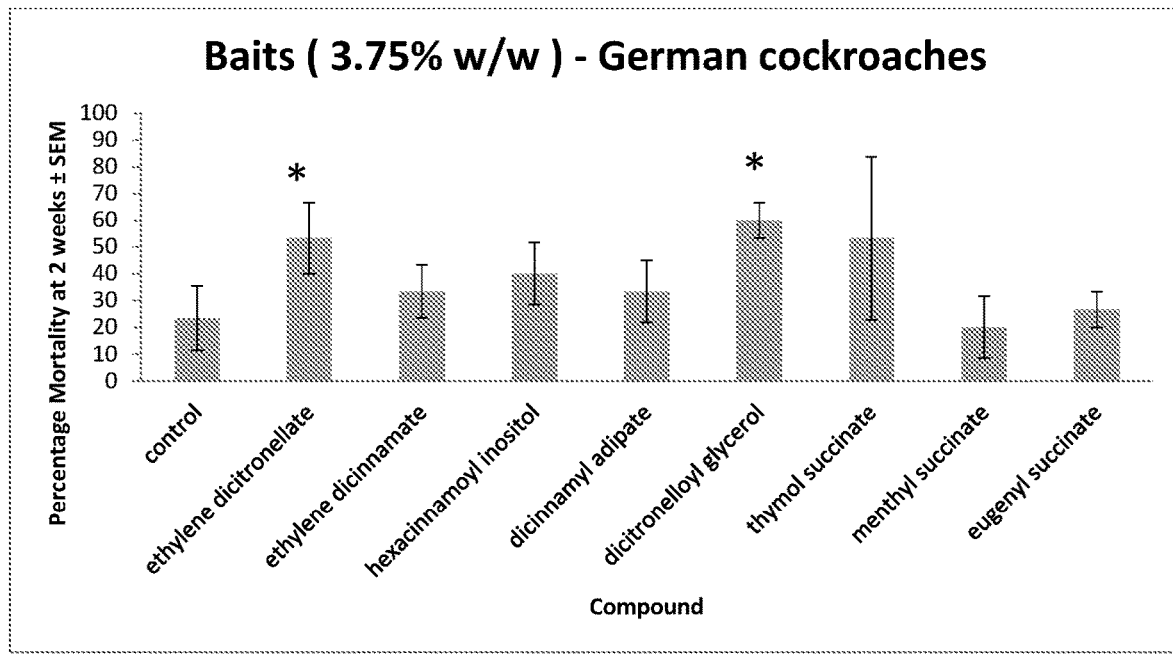
FIG. 2 is a graph showing mortality of German cockroaches exposed to a diet of 3.75% weight compound/weight food at two weeks. At this concentration in food, numerous compounds were capable of producing significant mortality compared to the control (a 0.05).

A majority of the compounds tested caused percentage mortality at two weeks that was greater than the control. FIG. 1 portrays the percentage mortality of German cockroaches exposed to various compounds at a concentration of 3.75% weight compound/weight food for multiple weeks. Ethylene dicitronellate was capable of causing considerably higher percentage mortality compared to the control at 1, 2, and 3 weeks after exposing roaches to the treated food. Conversely, the control (acetone only) exhibited 23.3% mortality at 60% at 2 weeks after introducing cockroaches. When screening a larger number of compounds at 3.75% weight compound/weight food for two weeks (single time point), two compounds caused statistically significant percentage mortality compared to the control (α=0.05) (FIG. 2). These compounds were ethylene dicitronellate and dicitronelloyl glycerol. Multiple other compounds at this lower rate caused numerically higher mortality than the control, as well.

Figure 3:
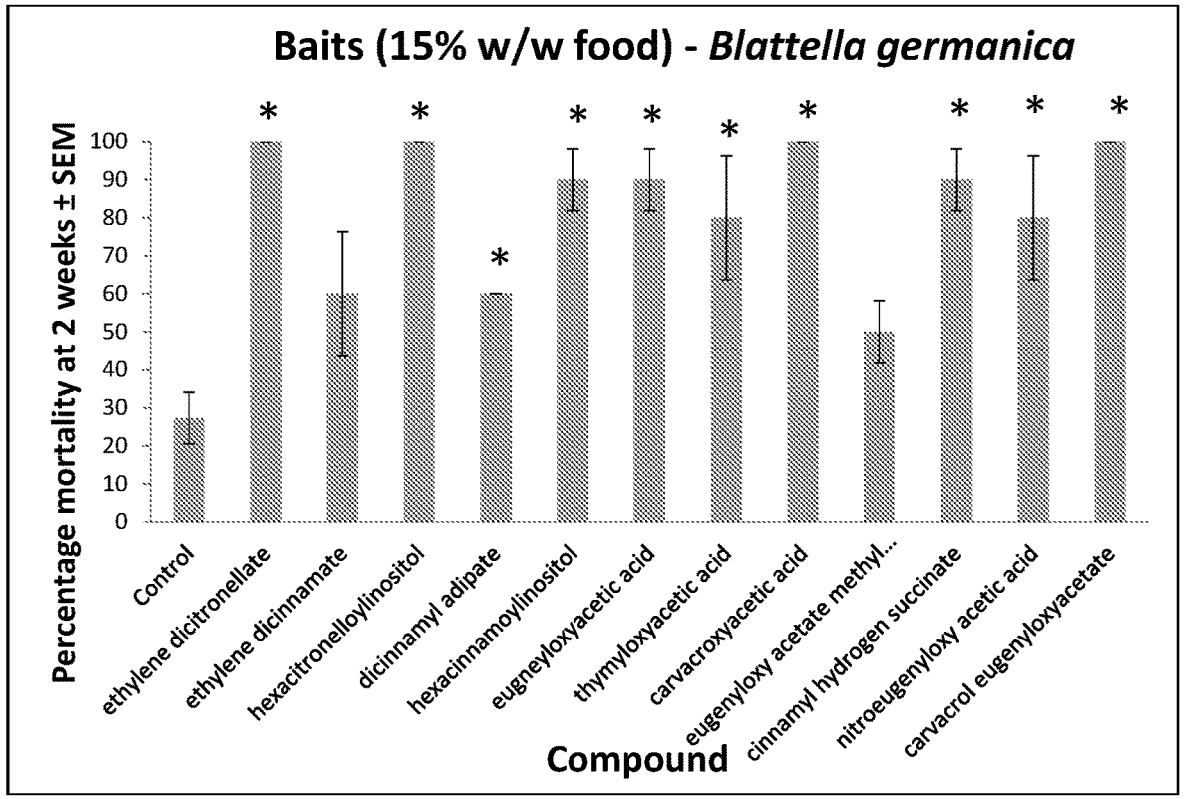
FIG. 3 is a graph showing percentage mortality of German cockroaches exposed to diet containing 15% weight compound/weight food at two weeks after introduction into mason jars. Of the 12 compounds screened at this concentration, 10 compounds caused statistically significant mortality compared to the control.

To assess the efficacy of various bait compounds against German cockroaches at higher concentrations, a second set of experiments was conducted with 15% compound/weight food. The most effective compounds identified from the previous experiment were screened. FIG. 3 illustrates the efficacy of a large number of various compounds against German cockroaches when incorporated into food at 15% w/w. At this concentration, a higher percentage mortality was observed for each compound screened. Among these compounds tested at 15% weight/weight food, many produced mortality that was significantly higher than observed in the control. Moreover, two of these compounds caused 100% mortality at two weeks after incorporating them into cockroach food at a concentration of 15% w/w food. These compounds included ethylene dicitronellate and hexacitronellyl inositol. All compounds screened at this concentration caused numerically higher percentage mortality than the control treatment.

Example 3—House Fly Feeding (Solid Food)

Materials and Methods

Insects

House flies (*Musca domestica*) were obtained from an established colony maintained by the Pesticide Toxicology Laboratory, Department of Entomology at Iowa State University, Ames IA Flies were maintained according to standard laboratory protocols. House flies were supplied with water via cotton wick and solid support of sugar and dry milk (mixed 1:1), ad libitum. Prior to testing, house flies were maintained at a temperature of 24±2° C., were held at 30%±10% relative humidity, and a 12:12 hr light:dark photoperiod. Flies were randomly chosen from one of three separate Bioquip BugDorm® cages on different days to prevent a potential bias in vigor.

Feeding Assay (Non-Choice Assay)

Approximately 20-30 adult house flies (*Musca domestica*) were introduced into aquaria (2.5 gallon) with a French square filled with de-ionized water. Cotton dental wicks were used to draw water up and present it to flies at the top of the French square. Different concentrations of compounds were introduced into 1:1 mixtures of evaporated milk powder and sucrose. 2 grams of food was provided to flies with compound incorporated at various weights by weight food. If the material was solid, a mortar and pestle was used to homogenize the crushed evaporated milk powder, sucrose, and compound. If the material was a liquid, it was dissolved in acetone and aliquotted into the food slowly until the desired concentration of compound by weight food was achieved. If acetone was used as the carrier throughout the experiment, the food was carefully stirred repeatedly to ensure evaporation so that no more acetone was present in the food. The concentration used to assess mortality was 5% weight compound by weight food. Total mortality was assessed at 5 days after introducing house flies into individual mason jars with food treated with different compounds. Further experiments were conducted to assess the success of baits with Z-9-tricosene (Muscalure®), a potent house fly sex pheromone commonly added to fly toxic baits and traps.

Feeding Assay (Choice Assay)

This assay was performed similarly to the non-choice feeding assay with a number of important modifications. The choice assay included one untreated food source of 1:1 evaporated milk powder and sucrose and one treated food source (with toxic biorational compounds) comprised of the same materials. Moreover, toxic insecticidal bait compounds were incorporated into the food mixture at a concentration of 15% w/w food. This increased concentration of toxic insecticidal bait was chosen to account for the concomitant lower percentage mortality expected due to the presence of both a treated and untreated food source. Mortality was recorded at 5-days post exposure.

Data Analysis

Data is presented as average percentage mortality with the standard error of the mean (SEM). This number was compared to the total number of flies introduced to each aquaria for each replicate, and a percentage mortality was calculated. A minimum of three replicates were performed for each compound.

Results

Figure 4:
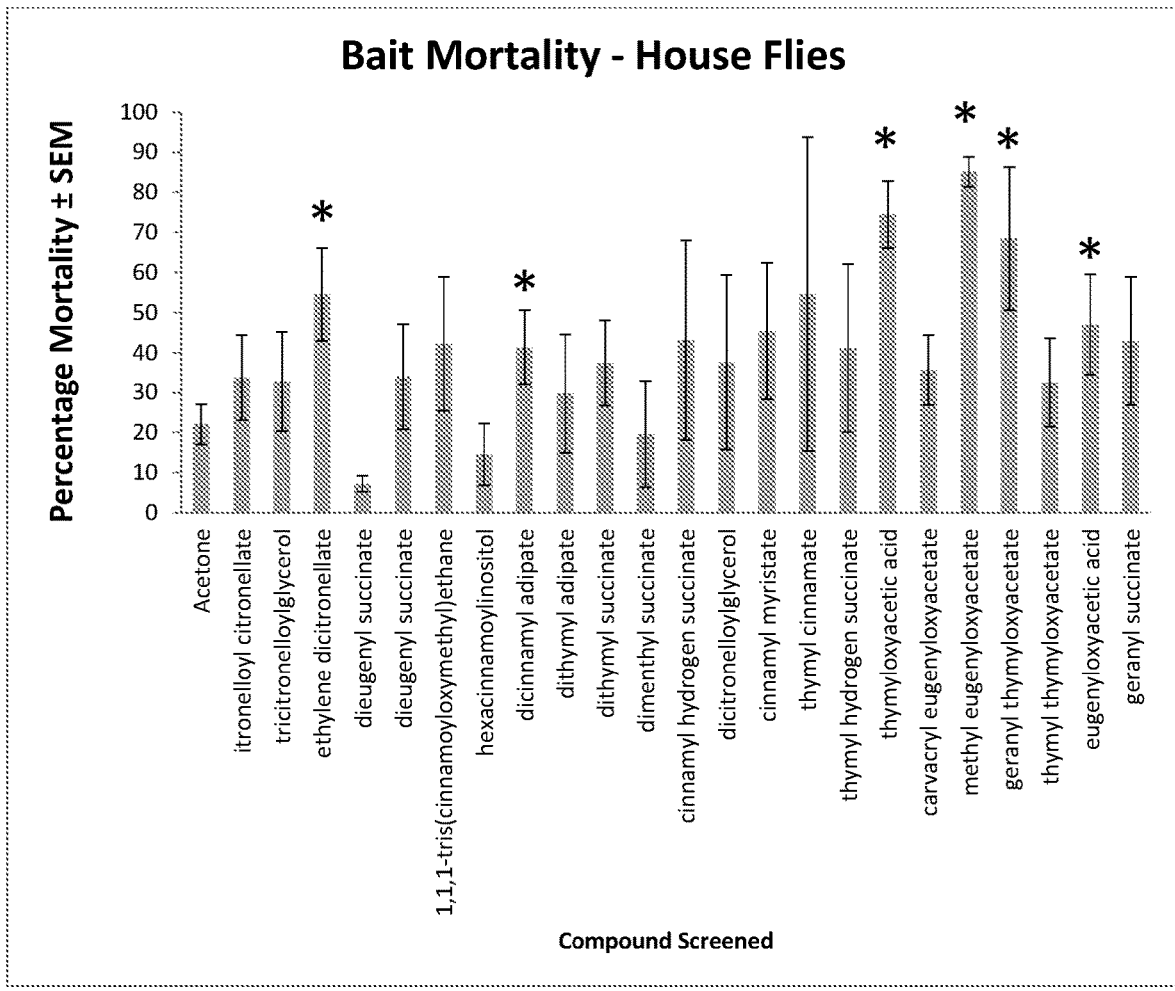
FIG. 4 is a graph demonstrating the percentage mortality of house flies exposed to diet that contains 5% weight monoterpenoid derivative/weight food. Numerous terpenoid derivatives cause significant mortality at 5 days compared to the control treatment (no compound).

A majority of compounds screened caused higher percentage mortality than the control when introduced into house fly food at 5% weight/weight food. FIG. 4 demonstrates the success of numerous compounds tested as potential insecticidal fly baits. The control treatment caused a mortality of approximately 22%, which demonstrates that this assay is robust and capable of assessing whether or not compound could act as an insecticidal bait. Of the compounds, ethylene dicitronellate, thymyl cinnamate, thymyl hydrogen succinate, methyl eugenyloxyacetate, geranyl thymyloxyacetate, and eugenyloxyacetic acid caused percentage mortality that was greater than 50%. Thymyl hydrogen succinate, cinnamyl myristate, dicinnamyl adipate, and hexacinnamoyl inositol all produced mortality above 40%. The wide range of efficacy among these compounds at 5% weight/weight food demonstrates the potential of these compounds to be toxic to house flies when provided as baits. Moreover, some compounds within this set were not observed to be insecticidal indicating that unique and distinct mechanisms of toxicity may exist among each molecule within this set of chemistries.

Figure 5:
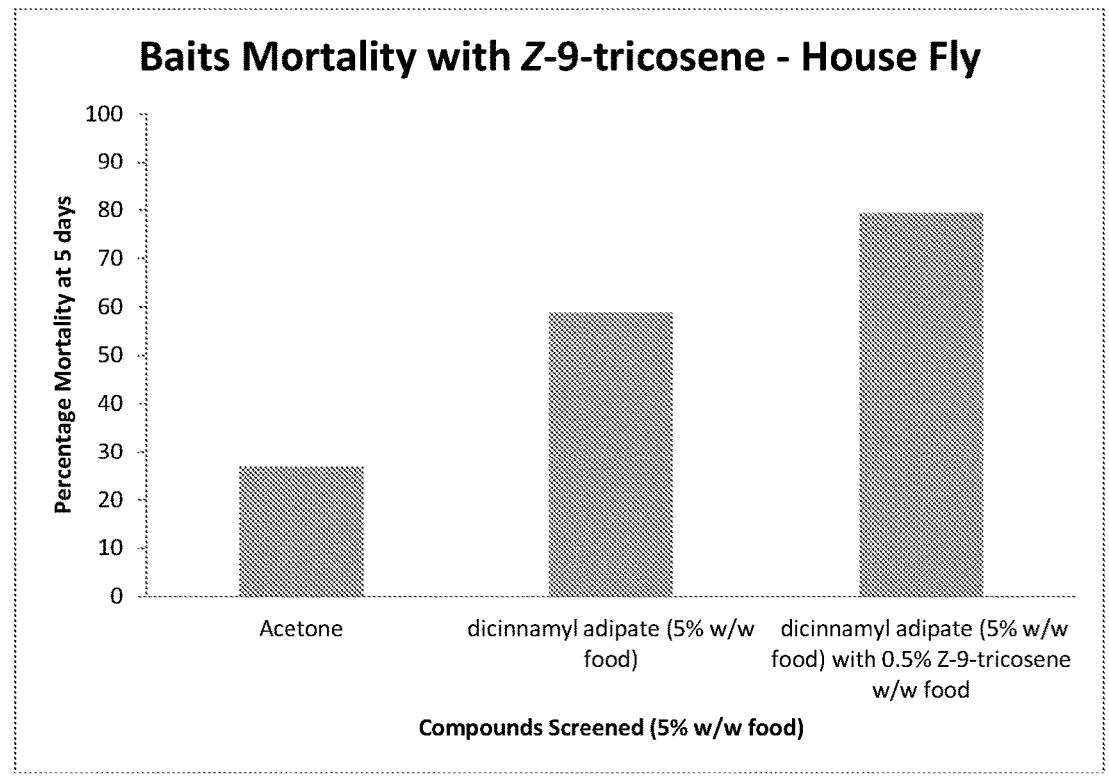
FIG. 5 is a graph demonstrating the increased toxicity of dicinnamyl adipate, a monoterpenoid derivative, when incorporated at 5% weight compound by weight food with the addition of 0.5% Z-9-tricosene (Muscalure™). Muscalure is a compound that acts as a fly sex pheromone and significantly increases the willingness of house flies to visit and feed on the bait. Acetone was applied and allowed to evaporate in the acetone control (Acetone).
Figure 6:
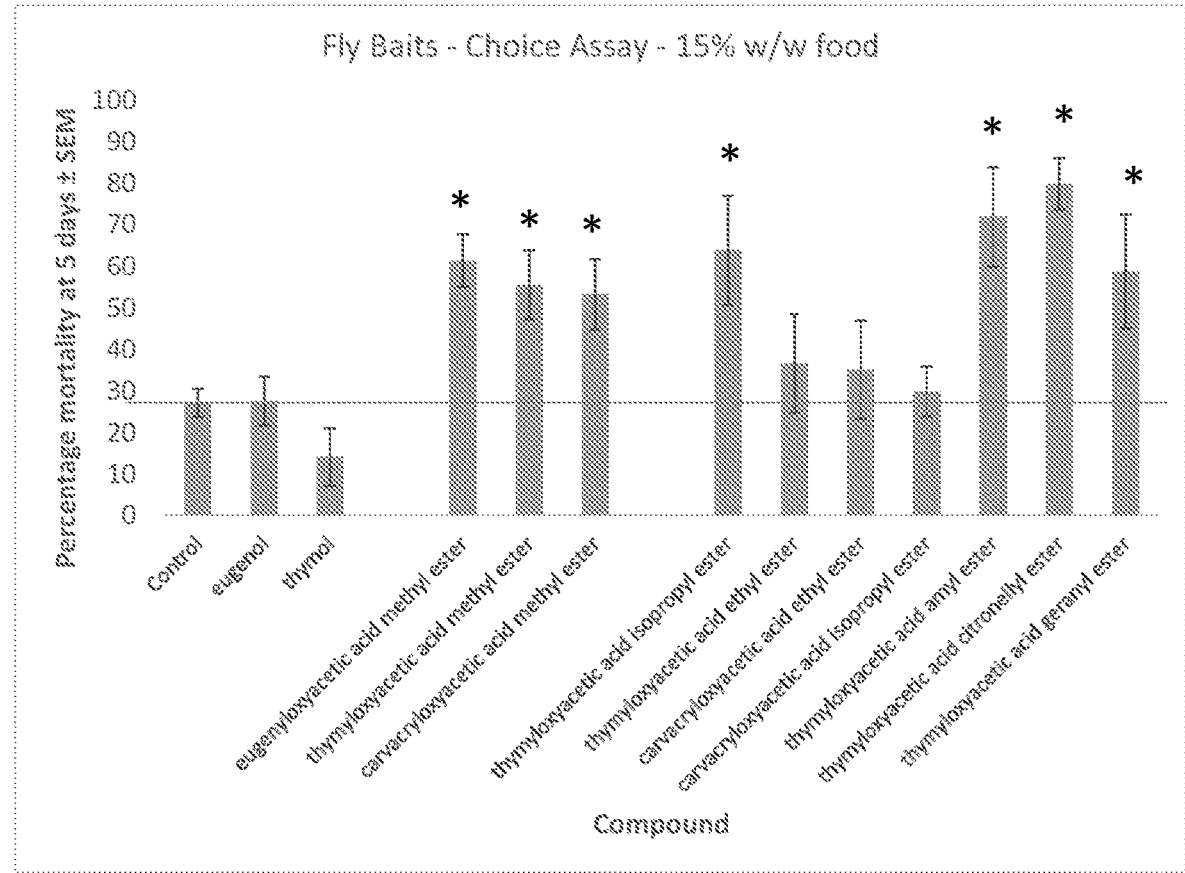
FIG. 6 is a graph demonstrating the toxicity of various compounds against house flies in a choice assay. This assay includes both treated and untreated food. This assay demonstrates that many of these compounds are both toxic and palatable in the presence of untreated food sources.

To further test the insecticidal character of these compounds when provided as part of the diet of house flies, Z-9-tricosene was added to the mixture to encourage fly feeding on the toxic mixture. Z-9-tricosene is a potent sex pheromone used by male house flies to identify female house flies. This compound is a component of many commercial fly baits and increases their efficacy by attracting a greater number of flies to the presented toxic bait. In this experiment, there was a higher percentage mortality observed in treatments that were comprised of both compound and Z-9-tricosene at 0.5% weight/weight food (FIG. 5). Once again, dicinnamyl adipate was added to the diet at a concentration of 5% weight/weight food. This further demonstrates the toxicity of dicinnamyl adipate, one of the more toxic compounds identified in the previous experiment and suggests that these compounds have the potential to be used in formulations that mimic commercially available toxic fly baits.

Finally, house flies were provided food in a choice assay to assess the palatability of these various insecticidal compounds and their efficacy in the presence of untreated sources of food. This may mimic the natural environment in which flies may potentially have multiple food sources upon which to feed. In this exploration the methyl esters of the various oxyacetic acids were the most successful and palatable baits. Moreover, the isopropyl, amyl, citronellyl and geranyl ester of thymyloxyacetic acid were all capable of producing significant levels of toxicity in this choice assay, suggesting their overall palatability and utility as future insecticidal baits.

These data in concert suggest that these compounds could represent novel insect bait compositions. Their efficacy at various concentrations in different bait media clearly indicates their insecticidal potential.

Example 4—House Fly Feeding (Water-Based Insecticidal Sucrose Baits)

Materials and Methods

Insects

House flies (*Musca domestica*) were obtained from an established colony maintained by the Pesticide Toxicology Laboratory, Department of Entomology at iowa State University, Ames IA Flies were maintained according to standard laboratory protocols. House flies were supplied with water via cotton wick and solid support of sugar and dry milk (mixed 1:1), ad libitum. Prior to testing, house flies were maintained at a temperature of 24±2° C., were held at 30%±10% relative humidity, and a 12:12 hr light:dark photoperiod. Flies were randomly chosen from one of three separate Bioquip BugDorm® cages on different days to prevent a potential bias in health.

Feeding Assay

For this study, sucrose bait formulations were prepared by combining a 10% w/w mixture of certified ACS crystalline sucrose and de-ionized water, with 0.5% v/v 200 proof ethyl alcohol and 0.5% v/v of the emulsifier TWEEN® 80 (polyoxyethylene). All of these components were obtained from Fisher Scientific Company in Fair Lawn, NJ Sucrose bait formulations were created in 10 mL amounts in a 10 mL volumetric flask. Then 5 mL of the formulation was then placed into two 2-dram glass vials. Test compounds were solubilized at a concentration of 0.1% w/w formulation. Ten house flies (mixed sex) were placed into 8-oz deli cups, with a minimum of two replicates for each treatment. A cotton wick was introduced to the vial in order to present the sucrose formulation to the flies. Parafilm® was wrapped around each vial to keep the wick in place and stop the mixture from spilling/evaporating. Tulle was secured to the top of the cups to ensure that flies were unable to escape the testing arena. A negative control (Starved) in which flies were not provided with sucrose or food was run, concurrently, with the experiment to demonstrate whether flies fed on the baits. Flies that did not feed expired within 24 hours of introduction into the test arena. A positive control of boric acid was used to demonstrate the efficacy of toxic components used in other commercial insecticidal baits in this bioassay. Boric acid is an established and commercially utilized bait that produces high levels of mortality in this assay. Houseflies were monitored for 5 days after introduction into the testing chamber and mortality was recorded each day, at 24-hour intervals. Percentage mortality was calculated as the average percentage mortality associated with all replicates for a particular treatment ± the standard error of the mean. A one-way ANOVA ($\alpha=0.05$) with a post-hoc Student-Newman-Keuls means comparison test was used to determine statistically significant effects between treatments at various time points.

Results

Figure 7:
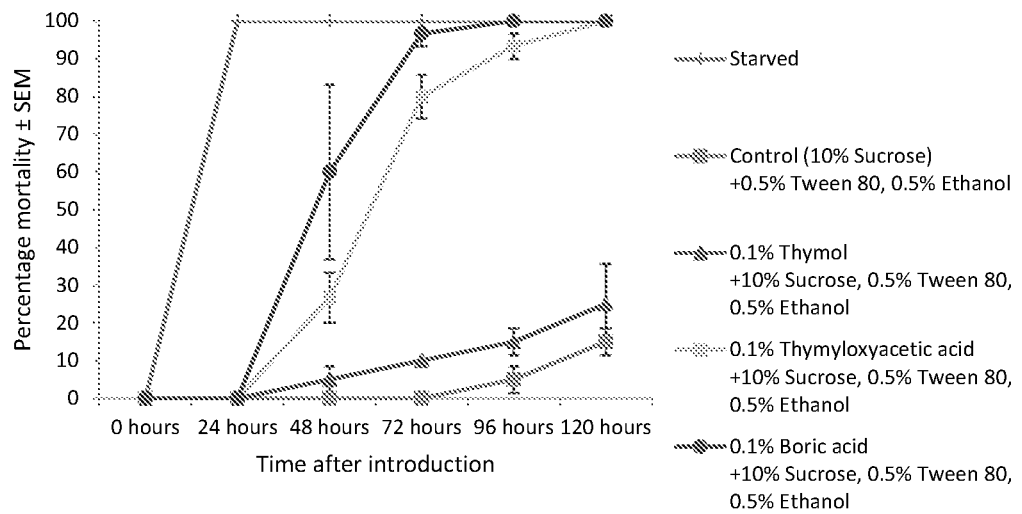
FIG. 7 is a graph showing percentage mortalities of house flies exposed to thymyloxyacetic acid and other active ingredients as formulated emulsions at 24-hour intervals after introduction into the testing chamber. Thymyloxyacetic acid compared similarly to boric acid at all time points observed. Moreover, both boric acid and thymyloxyacetic acid were capable of causing 100% mortality at 120 hours after introduction. This data demonstrates the potential of select novel biorationals as insecticidal baits against house flies when provided as a liquid formulation containing sucrose and emulsifiers.

In this bioassay, the thymol derivative tested caused significant percentage mortality provided in an emulsion of sucrose, Tween 80, ethanol against house flies (FIG. 7). The starved control caused statistically significant percentage mortality at 24-hours compared to all other treatments after application demonstrating the rate at which mortality occurs in flies that do not feed on the supplied baits. This was compared to the 10% sucrose-only control, which experienced very low percentage mortality throughout the experimental interval. The maximum mortality associated with the 10% sucrose-only control was 15±3.53% at 120 hours after introducing flies into the testing arena. This data demonstrates that this bioassay is robust and capable of detecting the toxic effects of select biorationals provided as insecticidal baits.

Houseflies provided with water formulations containing 0.1% thymyloxyacetic acid experienced significant percentage mortality compared to the sucrose-only control at 48, 72, 96, and 120 hours after introducing flies into the testing arena, with mortalities of 26.7%, 80%, 93.3%, and 100%, respectively. The delayed mortality of thymyloxyacetic acid in this bioassay suggests that flies successfully fed on these baits and experienced toxic effects. Thymyloxyacetic acid and boric acid performed similarly at 48, 72, and 96 hours after introduction into the testing arena, as determined by the lack of statistical significance between both treatments. Moreover, both thymyloxyacetic acid and boric acid caused 100% mortality at 120 hours after introducing flies into the testing arena. This was compared to the percentage mortality of thymol caused at 120 hours after introduction of test insects, 25±10.7%.

This dataset demonstrates that select synthetic biorational derivatives are very successful as insecticidal baits against house flies and perform similarly to other products available on the market. Moreover, the higher percentage mortality compared to thymol alone suggests that these biorational compounds are more toxic than the parent monoterpenoids used in their synthesis.

Example 5—Mosquito Feeding Assays (Water-Based Insecticidal Sucrose Baits)

Materials and Methods

Mosquitoes

Northern house mosquitoes (*Culex pipiens*), a primary carrier of West Nile Virus in eastern North America, were obtained from an established colony in the Medical Entomology Laboratory in the Department of Entomology at Iowa State University of Science and Technology, Ames Iowa. Mosquito rearing was performed by established protocols that are maintained by the Medical Entomology Laboratory. Repellency bioassays were performed with adult female mosquitoes that were 5-7 days post-emergent. After emergence and prior to testing, adult mosquitoes were supplied with a piece of cotton that was soaked in a 10% sucrose solution ab libitum. The mosquitoes tested did not receive a blood meal. Mosquitoes, prior to testing, were held at 27° C., 80% relative humidity, and on a 16:8 hr light:dark photoperiod.

Feeding Assay

For this study, sucrose bait formulations were prepared by combining a 10% w/w mixture of certified ACS crystalline sucrose and de-ionized water, with 0.5% v/v 200 proof ethyl alcohol, and 0.5% v/v of the emulsifier Tween 80 (polyoxyethylene). All of these components were obtained from Fisher Scientific Company in Fair Lawn, NJ Sucrose bait formulations were created in 10 mL amounts in a 10 mL volumetric flask. 5 mL of the formulation was then placed into two 2-dram glass vials. Test compounds were solubilized at a concentration of 0.1% w/w formulation. Ten northern house mosquito females were placed into 8-oz deli cups, with a minimum of two replicates for each treatment. A cotton wick was introduced to the vial in order to present the sucrose formulation to the mosquitoes. Parafilm was wrapped around each vial to keep the wick in place and stop the mixture from spilling/evaporating. Tulle was secured to the top of the cups to ensure that mosquitoes were unable to escape the testing arena. A negative control (Starved) in which mosquitoes were not provided with sucrose or food was run, concurrently, with the experiment to demonstrate whether mosquitoes fed on the baits. Mosquitoes that did not feed expired within 72 hours of introduction into the test arena. A positive control of boric acid was used to demonstrate the efficacy of toxic components used in other commercial insecticidal baits in this bioassay. Northern house mosquito females were monitored for 6 days after introduction into the testing chamber and mortality was recorded each day, at 24-hour intervals. Percentage mortality was calculated as the average percentage mortality associated with all replicates for a particular treatment ± the standard error of the mean. A one-way ANOVA ($\alpha=0.05$) with a post-hoc Student-Newman-Keuls means comparison test was used to determine statistically significant effects between treatments at various time points.

Results

Figure 8:
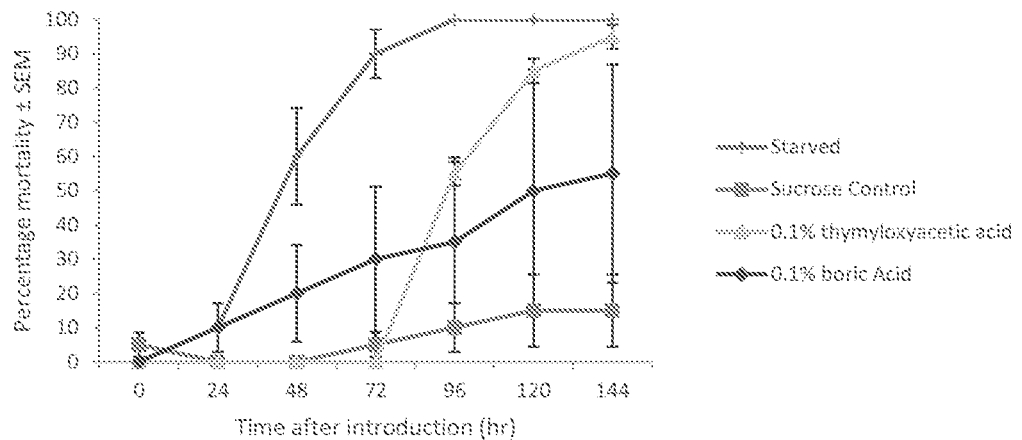
FIG. 8 is a graph showing percentage mortalities of northern house mosquitoes exposed to 0.1% thymyloxyacetic acid and other active ingredients as formulated emulsions at 24-hour intervals after introduction into the testing chamber. Thymyloxyacetic acid and boric acid were compared at six time points. In this experiment, thymyloxyacetic acid caused higher numerical percentage mortality than boric acid at 96, 120, and 144 hours after introduction. This data demonstrates the potential of select novel biorationals as insecticidal baits against mosquito species when provided as a liquid formulation containing sucrose and emulsifiers.

In this bioassay, the thymol derivative tested caused higher percentage mortality at the end of the bioassay than the other treatments (FIG. 8). Moreover, the percentage mortality associated with the sucrose-only control remained low throughout the entirety of the experimental assay, with a maximum value of 15±10.6%. Also, the starved controls experienced significant percentage mortality at 72 hours after introduction and later in the experimental setup. This demonstrates that this bioassay is useful in determining the ability of insects to feed on various insecticidal baits and their respective toxicities.

Northern house mosquitoes provided with water formulations containing 0.1% thymyloxyacetic acid experienced statistically significant percentage mortality compared to the sucrose-only control at 96, 120, and 144 hours after introduction. The 0.1% thymyloxyacetic acid performed as well as boric acid at all time points tested, as determined by the lack of statistical significance between these two treatments at all time points observed. The delayed toxic effect of both the 0.1% thymyloxyacetic acid and boric acid compared to the starved control demonstrates that northern house mosquitoes were capable of feeding on the water-formulated bait and that these formulations caused significant toxicity in this bioassay. Thymyloxyacetic acid caused much higher numerical percentage mortality compared to boric acid at 120 and 144 hours after introduction. The maximum percentage mortality caused by this compound in this bioassay was 95±3.53% at 144 hours after introduction.

Figure 9:
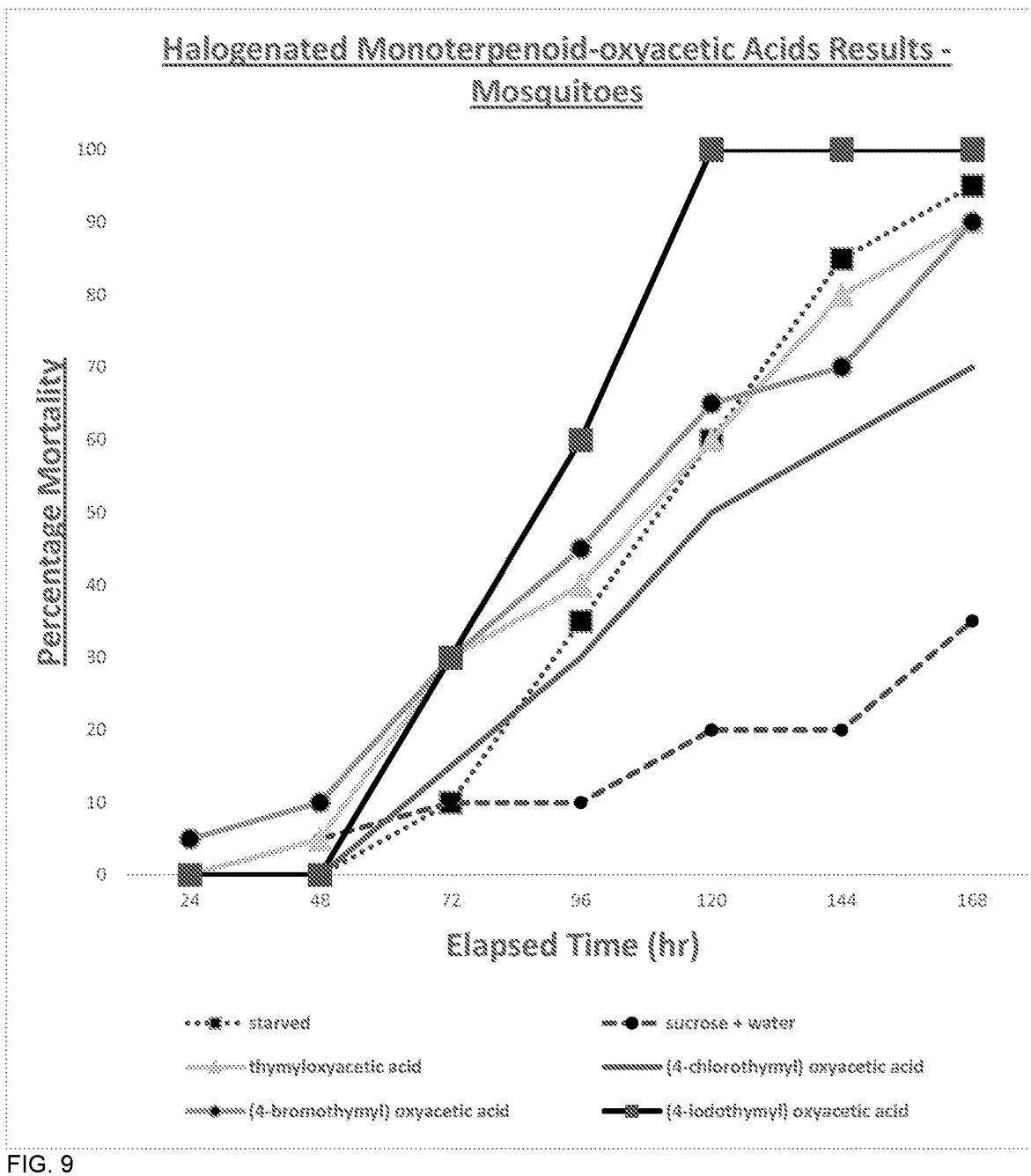
FIG. 9 is a graph showing percentage mortalities of northern house mosquitoes exposed to 0.1% of various different halogenated toxic bait compounds. This experiment demonstrates that substituted versions of these molecules are also efficacious as insecticidal bait compounds.

This data (FIG. 9) demonstrates that select novel biorational compounds are capable of producing high percentage mortality in northern house mosquitoes, and are capable of similar efficacy to other insecticidal bait products currently on the market. This data suggests that thymyloxyacetic acid and other novel biorationals disclosed in this patent application may be more efficacious against mosquito species than current products available in attractive toxic sugar baits and other commercially available water-formulated mosquito control products.

To the extent necessary to provide descriptive support, it shall be understood that the subject matter and/or text of any appended claims are incorporated herein by reference in their entirety.

It will be understood by all readers of this written description that the example embodiments described herein may be suitably practiced in the absence of any recited feature, element or step that is, or is not, specifically disclosed herein.

What is claimed is:

1. A method for killing an insect or arthropod pest, comprising the steps of:
   a. providing an insecticidal bait formulation comprising (i) one or more of a carrier or bait matrix that includes a substance that will entice, induce, compel or otherwise cause the insect to ingest the insecticidal bait formulation and (ii) an effective amount of an insecticidal compound comprising thymyloxyacetic acid or esters of thymyloxyacetic acid selected from the group of methyl, isopropyl, amyl, citronellyl and geranyl esters; and
   b. exposing the insect or arthropod pest to the insecticidal bait formulation, wherein the insecticidal compound is present in the insecticidal bait formulation in amounts ranging from 0.1% w/w to 15% w/w, based upon the total weight of the insecticidal bait formulation.

2. The method of claim 1, wherein the insecticidal compound is methyl thymyloxyacetate.

\* \* \* \* \*